US009860859B2

(12) United States Patent
Choi et al.

(10) Patent No.: US 9,860,859 B2
(45) Date of Patent: Jan. 2, 2018

(54) APPARATUS AND METHOD FOR ALIGNING DISCOVERY CHANNEL INTERVALS AMONG CELLS IN CELLULAR COMMUNICATION SYSTEM

(71) Applicants: Samsung Electronics Co., Ltd., Suwon-si, Gyeonggi-do (KR); Research & Business Foundation SUNGKYUNKWAN UNIVERSITY, Suwon-si, Gyeonggi-do (KR)

(72) Inventors: Hyung-Jin Choi, Seoul (KR); Hyun-Seok Ryu, Yongin-si (KR); Seung-Hoon Park, Seoul (KR); Kyung-Hoon Lee, Seoul (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 236 days.

(21) Appl. No.: 14/681,546

(22) Filed: Apr. 8, 2015

(65) Prior Publication Data
US 2015/0296365 A1    Oct. 15, 2015

(30) Foreign Application Priority Data

Apr. 9, 2014  (KR) .......................... 10-2014-0042543

(51) Int. Cl.
*H04W 56/00* (2009.01)
*H04W 48/16* (2009.01)
*H04W 76/02* (2009.01)

(52) U.S. Cl.
CPC .......... *H04W 56/00* (2013.01); *H04W 48/16* (2013.01); *H04W 76/023* (2013.01)

(58) Field of Classification Search
CPC .... H04L 5/0073; H04W 8/005; H04W 56/00; H04W 72/08; H04W 76/02
See application file for complete search history.

(56) References Cited

U.S. PATENT DOCUMENTS 7,983,702 B2   7/2011  Li et al.
8,520,650 B2   8/2013  Esteves et al.
(Continued)

OTHER PUBLICATIONS

3GPP TSG-RAN WG1 #74, Techniques for D2D Discovery, R1-133600, Qualcomm Incorporated, Aug. 19-23, 2013.
(Continued)

*Primary Examiner* — Andrew Lai
*Assistant Examiner* — Leon Andrews
(74) *Attorney, Agent, or Firm* — Jefferson IP Law, LLP

(57) ABSTRACT

In the instant disclosure a method includes selecting at least one UE located in the serving cell and operates in a RRC connected mode, transmitting, to the at least one UE, a request message requesting information related to a discovery channel of the neighbor cell, receiving, from the at least one UE, at least one of an ID of the neighbor cell, a temporally adjusted value obtained by shifting the discovery channel with respect to a frame reference time of the neighbor cell, or an NTD between the serving cell and the neighbor cell, and aligning the discovery channel interval of the serving cell to the discovery channel interval of the neighbor cell based on the at least one of the ID of the neighbor cell, the temporally adjusted value, or the NTD, by a serving eNB managing the serving cell.

20 Claims, 21 Drawing Sheets

(56) References Cited

U.S. PATENT DOCUMENTS

| | | |
|---|---|---|
| 2012/0269178 A1 | 10/2012 | Li et al. |
| 2014/0024388 A1* | 1/2014 | Earnshaw ............. H04L 5/0073 |
| | | 455/452.2 |
| 2016/0037568 A1* | 2/2016 | Hakola ................. H04W 8/005 |
| | | 370/329 |

OTHER PUBLICATIONS

3GPP TSG-RAN WG1 #74, Resource Allocation for Inter-cell D2D Discovery, R1-134503, NH DOCOMO, Oct. 7-11, 2013.
3GPP TSG-RAN R4-094532, System Simulation Results for OTDOA, Nov. 9-13, 2009.
S. Sesia et al., LTE The UMTS Long Term Evolution from Theory to Practice, Wiley, 2009.

* cited by examiner

APPARATUS AND METHOD FOR ALIGNING DISCOVERY CHANNEL INTERVALS AMONG CELLS IN CELLULAR COMMUNICATION SYSTEM

CROSS-REFERENCE TO RELATED APPLICATION(S)

This application claims the benefit under 35 U.S.C. §119(a) of a Korean patent application filed on Apr. 9, 2014 in the Korean Intellectual Property Office and assigned Serial number 10-2014-0042543, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) RESEARCH & BUSINESS FOUNDATION SUNG-KYUNKWAN UNIVERSITY.

TECHNICAL FIELD

The present disclosure relates to apparatuses and methods for aligning discovery channels among cells in wireless communication systems.

BACKGROUND

In general, technology for wireless communication in close proximity is referred to as near-field communication, and its representative example is device-to-device (D2D) communication that enables direct communication between devices. In D2D communication, user equipment (UE) first discovers a counterpart UE with which the UE attempts to communicate, establishes a communication session through a base station (e.g., evolved NodeB (eNB)), and directly transmits traffic through the communication session to the counterpart UE to which the UE desires to transmit traffic. As such, guarantying efficient data transmission between neighbor UEs while addressing the overload of eNB, D2D communication is recently gaining popularity as a next-generation mobile communication technology.

A Long Term Evolution (LTE) system-based UE may operate in both cellular mode and D2D mode considering the communication environment of the site where the UE is located or the type of service that the UE desires to receive. Here, cellular mode denotes a mode in which the UE performs communication through an eNB, and D2D mode denotes a mode in which the UE directly performs D2D communication under the control of an eNB. In a case where the UE operates in D2D mode, the UE performs communication with its counterpart UE using an uplink frequency band under the control of the eNB. Further, as a prior procedure for D2D communication, the UE performs a D2D discovery procedure that allows UEs to independently exchange signals without involvement of an eNB in order to identify the presence of neighbor UEs and to determine mutual proximity.

FIG. 1 is a view illustrating an example in which a UE performs a D2D discovery operation in a communication system according to the related art.

The discovery operation by a first UE 100 and a second UE 110 is described as an example with reference to FIG. 1.

Referring to FIG. 1, the first UE 110 broadcasts discovery signals 101, 103, and 105 for informing its presence to neighbor UEs, and a neighbor UE, the second UE 110, receives the discovery signal 111. Further, the second UE 110 broadcasts discovery signals 111, 113, and 115 for informing its presence to neighbor UEs and receives the discovery signal 105 broadcast from its neighbor UE, the first UE 100.

Here, the discovery signals 101, 103, 105, 111, 113, and 115, each, are transmitted in a channel interval for D2D discovery defined by the eNB in an uplink (UL) frequency band, and the first UE 100 or the second UE 110 recognizes the presence of its counterpart UE through a discovery signal received in the channel interval defined by the eNB. The channel interval for D2D discovery is described below in greater detail with reference to FIG. 2. Hereinafter, D2D communication-applied communication system is referred to as a D2D communication system.

FIG. 2 is a view illustrating an example of the structure of a discovery channel subframe and a UL subframe used in a D2D communication system according to the related art.

Referring to FIG. 2, the discovery channel subframe 200 denotes a channel interval for D2D discovery defined by the eNB, and the UL subframe 210 is positioned continuous to the discovery channel subframe 200. The discovery channel subframe 200, assuming a 10 MHz bandwidth 202, includes multiple subframes temporally consecutive, e.g., $N_D$ subframes, over the overall frequency band. Further, the discovery channel subframe 200, in light of physical resource block (PRB), may be represented as 44 PRBs, and the discovery signal 204 is transmitted in two PRBs, as arbitrarily determined, among the 44 PRBs.

Further, a physical uplink control channel (PUCCH) signal is transmitted in three PRBs 206 and 208 adjacent to the 44 PRBs used for D2D discovery.

Meanwhile, the eNB configures a start point and end point of the discovery channel subframe 200 in the form of a system information block (SIB) so that a D2D discovery operation may be performed based on the discovery channel subframe 200 and provides the same to each UE, and each UE performs a D2D discovery operation on the basis of the time of reception of the downlink synchronization signal, e.g., a primary synchronization signal (PSS), received from the eNB.

In the cellular communication system, in a case where a UE has established a communication session with an eNB in a neighbor cell of the cell where the UE is located or the UE communicates discovery signals with a counterpart UE located in the communication coverage of the neighbor cell, the eNB in the neighbor cell should offer information on the start point and end point of the discovery channel subframe from the neighbor cell. However, frame time synchronization between eNBs is not guaranteed by nature of LTE system, and under such asynchronous network environments, a time offset Network Time Difference (NTD) up to ±1 slot (±0.5 ms) may arise.

FIGS. 3A and 3B, respectively, illustrate a system configuration and a frame structure exemplifying the occurrence of inter-cell NTD in a cellular communication system under an asynchronous network environment according to the related art.

Referring to FIGS. 3A and 3B, the cellular communication system includes a first cell 300 and a second cell 350. The first cell 300 includes a first eNB eNB1 and UEs 303, 305, 307, and 309, and the second cell 350 includes a second eNB eNB2 and UEs 353, 355, and 357. Here, assume that the UEs denoted with 303, 307, and 353 operate in Radio Resource Control (RRC) connected (RRC_CONNECTED) mode, and the UEs denoted with 305, 309, 355, and 357 operate in RRC idle (RRC_IDLE) mode. The RRC connected mode UEs, after obtaining uplink synchronization with the eNB and establishing a communication link, continue to perform communication, and the RRC idle mode UEs, after obtaining a downlink synchronization with the eNB and obtaining related system information, intermittently receive control information only.

A UE to perform D2D capability may perform a D2D discovery operation on its neighbor UEs regardless of operation modes (RRC connected mode or RRC idle mode), and the eNB may provide the UEs with information on the discovery channel position of neighbor cells, i.e., the start point and end point of the discovery channel subframe. Further, since downlink synchronization signals are received substantially at the same time in the same cell, synchronization for discovery channel subframes is ensured to some degree.

However, in a case where, in a cellular communication system under an asynchronous network environment, inter-cell discovery channel subframes are aligned based on the discovery channel position information of the neighbor cell included in the SIB, the inter-eNB NTD may become larger than the length of the cyclic prefix (CP). Further, discovery signals received from the UE included in another cell may lose their orthogonality due to such NTD, or the discovery signals received from the UE included in the other cell may interfere with a discovery signal desired to be received, presenting an obstacle to seamless D2D discovery.

In other words, as shown in FIG. 3A, discovery channel interval synchronization is guaranteed between the UEs 303 and 305 in the first cell, but not between the UE 309 in the first cell and the UE 353 in the second cell due to inconsistency in reception time between downlink synchronization signals. Further, the NTD between a subframe transmitted from the first eNB 301 and a subframe transmitted from the second eNB 351 may be represented as shown in FIG. 3B, as an example. NTDs 360, 362, and 364 up to ±slot may occur between the subframe transmitted from the first eNB 301 and the subframe transmitted from the second eNB 351. Here, assume that one subframe includes two slots, each including seven orthogonal frequency division multiplexing (OFDM) symbols.

Accordingly, the cellular communication system under the asynchronous network environment uses a separate frame synchronization scheme for scheduling the position of the inter-cell discovery channel interval in order to perform a D2D discovery operation.

FIG. 4 is a view illustrating an example of aligning inter-cell discovery channel intervals in a cellular communication system under an asynchronous network environment according to the related art.

Referring to FIG. 4, assume that the cellular communication system includes three macro cells and that the eNB of the serving cell is previously aware of per-subframe information on the start point and end point of a discovery channel for the eNB of a neighbor cell. Further, assume that the UE included in each cell may grasp the start position of the discovery channel for a neighbor cell by communicating a synchronization signal in the first subframe included in the discovery channel interval.

Referring to FIG. 4, described is a discovery channel interval aligning scheme that allocate respective discovery channel intervals for the first macro cell (Macro 1) 400, the second macro cell (Macro 2) 410, and the third macro cell (Macro 3) 420 not to overlap between the cells, for example.

That is, the UE in the first macro cell 400 communicates discovery signals in the first discovery channel interval 402 in the same way as the related art and receives discovery signals at the location 404 corresponding to the second macro cell 410 and the third macro cell 420. That is, the UE does not transmit any discovery signal at the location 404.

The UE in the second macro cell 410 communicates discovery signals in the second discovery channel interval 412 in the same way as the related art and receives discovery signals at the location 414 corresponding to the first macro cell 400 and the third macro cell 420. That is, the UE does not transmit any discovery signal at the location 414.

The UE in the third macro cell 420 communicates discovery signals in the third discovery channel interval 402 in the same way as the related art and receives discovery signals at the location 424 corresponding to the first macro cell 400 and the second macro cell 410. That is, the UE does not transmit any discovery signal at the location 424.

As shown, the first discovery channel interval 402 and the second discovery channel interval 412 are positioned with a gap for preventing overlap therebetween.

FIG. 5 is a view illustrating another example of aligning inter-cell discovery channel intervals in a cellular communication system under an asynchronous network environment according to the related art.

Referring to FIG. 5, assume that the cellular communication system includes seven macro cells and that the eNB of the serving cell is previously aware of per-subframe information on the start point and end point of a discovery channel for the eNB of each neighbor cell. Further, assume that the UE included in each cell may grasp the start position of the discovery channel for a neighbor cell by communicating a synchronization signal in the first subframe included in the discovery channel interval.

Referring to FIG. 5, the respective discovery channel intervals for the first macro cell (Macro 1) 500, the second macro cell (Macro 2) 510, and the third macro cell (Macro 3) 520 are allocated not to overlap between the cells, for example. The scheme for aligning discovery channel intervals not to overlap between cells has been described above in connection with FIG. 4, and no further detailed description thereof is given.

Then, the respective discovery channel intervals for non-neighbor cells, e.g., the first macro cell 500, a first' macro cell (Macro 1') 504, and a first" macro cell (Macro 1") 502, are allocated to overlap between the cells. In another example, the third macro cell 520, a third' macro cell (Macro 3') 524, and a third" macro cell (Macro 3") 522, may similarly be allocated to overlap between the cells. Accordingly, if the respective discovery channel intervals for the first macro cell 500, the first' macro cell 504, and the first" macro cell 502 are aligned, the respective discovery channel intervals of the cells are positioned in the same interval.

Techniques for aligning discovery channel intervals on an inter-cell subframe basis have been described above. However, the asynchronous network environment has an inter-cell NTD, and thus, the scheme for aligning discovery channel intervals on an inter-cell subframe basis may cause the following problems that are described below in connection with FIG. 6.

FIG. 6 is a view illustrating an example of a problem with a scheme for aligning discovery channel intervals on a subframe basis in a cellular communication system under an asynchronous network environment.

Referring to FIG. 6, assuming that UE B located in the cell where eNB B (eNB$_B$) 610 is present receives discovery signal S 601 from UE A located in the cell where eNB A (eNB$_A$) 600, there is an NTD between eNB A 600 and eNB B 610, and thus, a time offset larger than the CP length occurs. Accordingly, UE B, upon reception of discovery signal S 601, loses orthogonality.

Further, UE B may receive both discovery signal S 601 from eNB A 600 and discovery signal I$_1$ 621 from eNB C (eNB$_C$) 620. However, an NTD is present between eNBs A, B, and C (600, 610, and 620, and thus, discovery signal I$_1$ 621 is received overlapping discovery signal S 601, resulting in Inter-Channel Interference (ICI).

Further, UE B may receive discovery signal I$_2$ 631 from eNB D (eNB$_D$) 630, transmitted through a different frequency band PRB in the same subframe. However, an NTD is present between eNBs A, B, and D (600, 610, and 630), and thus discovery signal I$_2$ 631 is received by eNB B with its orthogonality lost, thus causing ICI with discovery signal S 601.

For the above reasons, signal to interference-plus-noise ratio (SINR) of discovery signal S 601 received by UE B worsens, deteriorating the UE's D2D discovery performance. Further, since the maximum size of an NTD creatable under the asynchronous network environment is ±1 slot, i.e., ±0.5 ms, the deterioration of D2D discovery performance cannot be addressed even by applying a 16.67 µs-long extended CP.

Meanwhile, the discovery channel interval aligning scheme described above in connection with FIG. 4 allows the UEs belonging to the serving cell to additionally receive discovery signals in the discovery channel interval of a neighbor cell without adjusting the position of discovery channels, preventing the above problems, i.e., orthogonality failure and ICI. However, an arising issue is that cellular communication is impossible during the interval where a discovery signal is additionally received. In particular, given a multi-cell environment, the discovery channel interval aligning scheme described above in connection with FIG. 4 employs a discovery channel interval whose length is three times or more as long as the legacy discovery channel interval (N$_D$ subframe), and in a case where the inter-discovery channel interval is considered to be up to one subframe, an additional limitation may be posed to cellular communication during subframes up to (2N$_D$+2).

FIG. 7 is a view illustrating an example of interference incurred by a non-neighbor cell in a cellular communication system under an asynchronous network environment according to the related art.

Referring to FIG. 7, reference numeral 710 denotes a discovery radius of arrival of a discovery signal from UE A 701 located in serving cell A 700, and reference numeral 720 denotes an Intersite distance (ISD) of each cell. Considering a discovery signal with a transmit power of 23 dBm and the discovery radius 710 of about 750 under a hexagonal cell environment with the ISD 720 of 500 m, UE A 701 may receive discovery signals from a UE located in a non-neighbor cell, cell A' 760, cell A" 750, or cell A'" 770. Even given a path loss due to distance, some UEs may receive discovery signals from a non-neighbor cell, and in such case, the SINR of a received discovery signal may be deteriorated.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for aligning inter-cell discovery channels in a cellular communication system.

Further, the present disclosure proposes an apparatus and method that allows a serving evolved NodeB (eNB) to align inter-cell discovery channels based on neighbor cell information fed back from UEs in a cellular communication system.

Further, the present disclosure proposes an apparatus and method that allows a serving eNB to select user equipment (UEs) to feedback neighbor cell information and align inter-cell discovery channels based on the neighbor cell information fed back from the selected UEs in a cellular communication system.

In accordance with an aspect of the present disclosure, a method for aligning discovery channel intervals of a serving cell and a neighbor cell in a cellular communication system is provided. The method includes selecting at least one UE, by a serving evolved node b (eNB) managing the serving cell, wherein the UE is located in the serving cell and operates in a radio resource control (RRC) connected mode, transmitting, to the at least one UE, a request message requesting information related to a discovery channel of the neighbor cell, receiving, from the at least one UE, an identifier (ID) of the neighbor cell, a temporally adjusted value obtained by shifting the discovery channel with respect to a frame reference time of the neighbor cell, and a network time difference (NTD) between the serving cell and the neighbor cell, and aligning the discovery channel interval of the serving cell in the discovery channel interval of the neighbor cell based on the ID of the neighbor cell, the temporally adjusted value, and the NTD.

In accordance with an aspect of the present disclosure, a method for aligning discovery channel intervals of a serving cell and a neighbor cell, by a UE, in a cellular communication system is provided. The method includes receiving, from a serving eNB managing the serving cell, a request message requesting information related to a discovery channel of the neighbor cell, detecting a downlink synchronization signal from the neighbor cell and obtaining a reception time of the synchronization signal of the neighbor cell, detecting a downlink synchronization signal from the serving cell and obtaining a reception time of the synchronization signal of the serving cell, estimating a NTD between the serving cell and the neighbor cell based on the synchronization signal reception time of the neighbor cell and the synchronization signal reception time of the serving cell, and transmitting the NTD to the serving eNB.

In accordance with an aspect of the present disclosure, an eNB for aligning discovery channel intervals of a serving cell and a neighbor cell in a cellular communication system is provided. The base station includes a controller configured to select at least one UE located in the serving cell managed by the eNB and operating in a RRC connected mode, and to align a discovery channel interval of the serving cell in a discovery channel interval of the neighbor cell based on an ID of the neighbor cell, a temporally adjusted value obtained by shifting the discovery channel with respect to a frame reference time of the neighbor cell, and a NTD between the serving cell and the neighbor cell, a transmitting unit configured to transmit, to the at least one UE, a request message requesting information related to a discovery channel of the neighbor cell, and a receiving unit configured to receive, from the at least one UE, the ID of the neighbor cell, the temporally adjusted value, and the NTD.

In accordance with an aspect of the present disclosure, a UE for aligning discovery channel intervals of a serving cell and a neighbor cell in a cellular communication system is provided. The UE includes a receiving unit configured to receive, from a serving evolved node b (eNB) managing the serving cell, a request message requesting information related to a discovery channel of the neighbor cell, to detect a downlink synchronization signal from the neighbor cell and obtain a reception time of the synchronization signal of the neighbor cell, and to detect a downlink synchronization signal from the serving cell and obtain a reception time of the synchronization signal of the serving cell, a controller configured to estimate a NTD between the serving cell and the neighbor cell based on the synchronization signal reception time of the neighbor cell and the synchronization signal reception time of the serving cell, and a transmitting unit configured to transmit the NTD to the serving eNB.

According to an embodiment of the present disclosure, the scheme aligns the discovery channel of the serving cell based on the information on neighbor cells, even on a sample basis, thus mitigating orthogonality failure of discovery signals and interference that may occur upon aligning discovery channels on a subframe basis as described above.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Described hereinafter is a scheme in which an evolved Node B (eNB) in a serving cell estimates the start point of a discovery channel for a neighbor cell based on information on neighbor cells received through at least one user equipments (UEs) and adjusts the position of a discovery channel interval of the serving cell to be aligned with the discovery channel interval of the neighbor cell, according to the following embodiment of the present disclosure.

Figure 1:
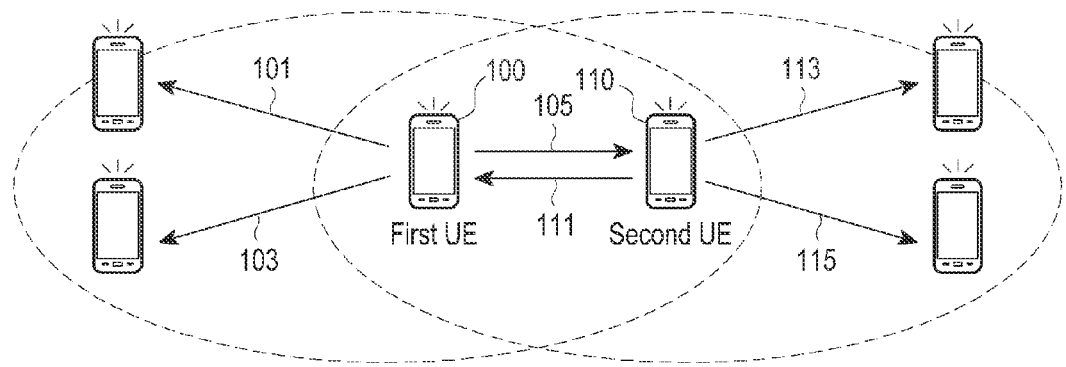
FIG. 1 is a view illustrating an example in which a user equipment (UE) performs a device-to-device (D2D) discovery operation in a communication system according to the related art.
Figure 2:
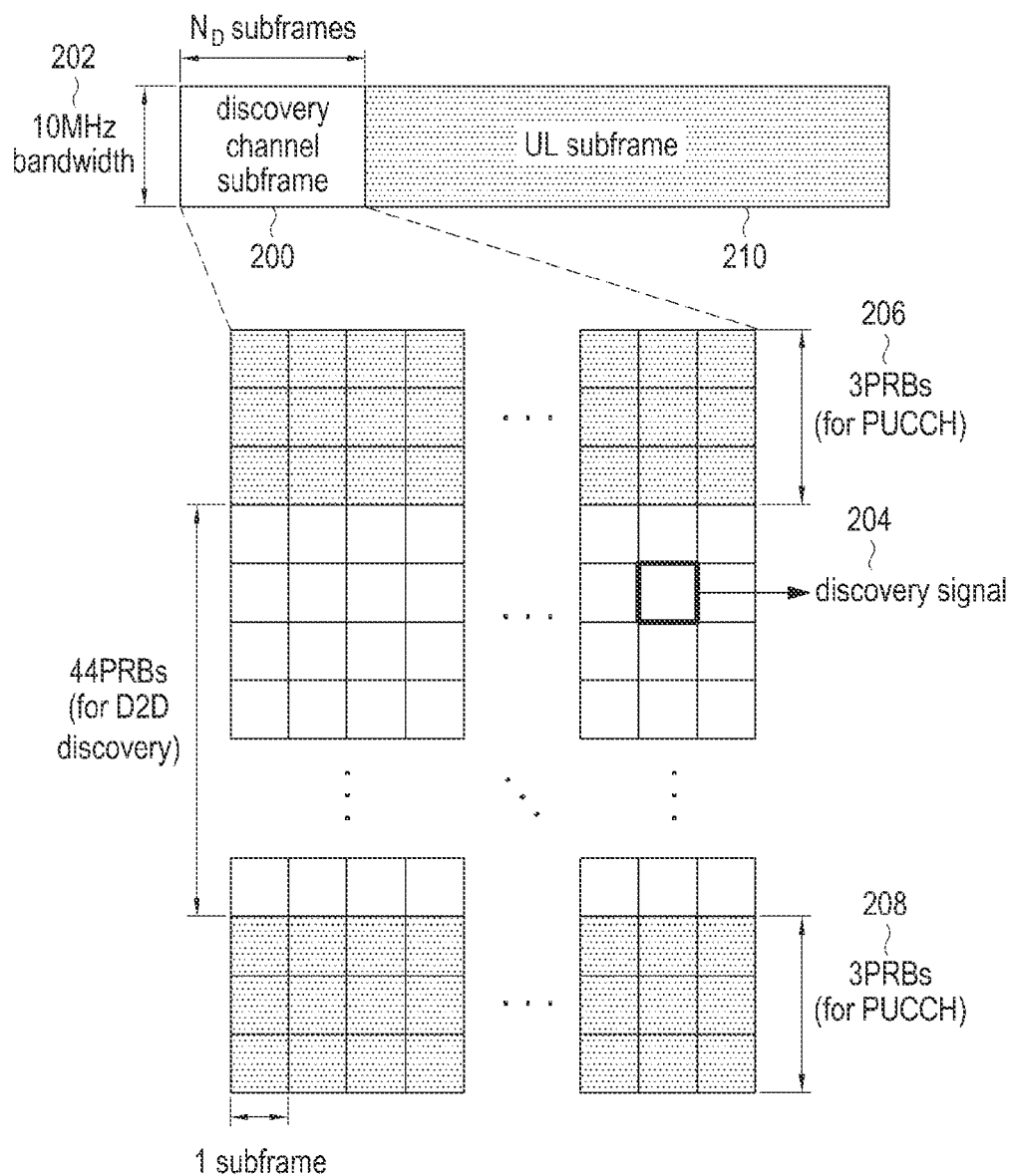
FIG. 2 is a view illustrating an example of the structure of a discovery channel subframe and a uplink (UL) subframe used in a D2D communication system according to the related art.
Figure 3A:
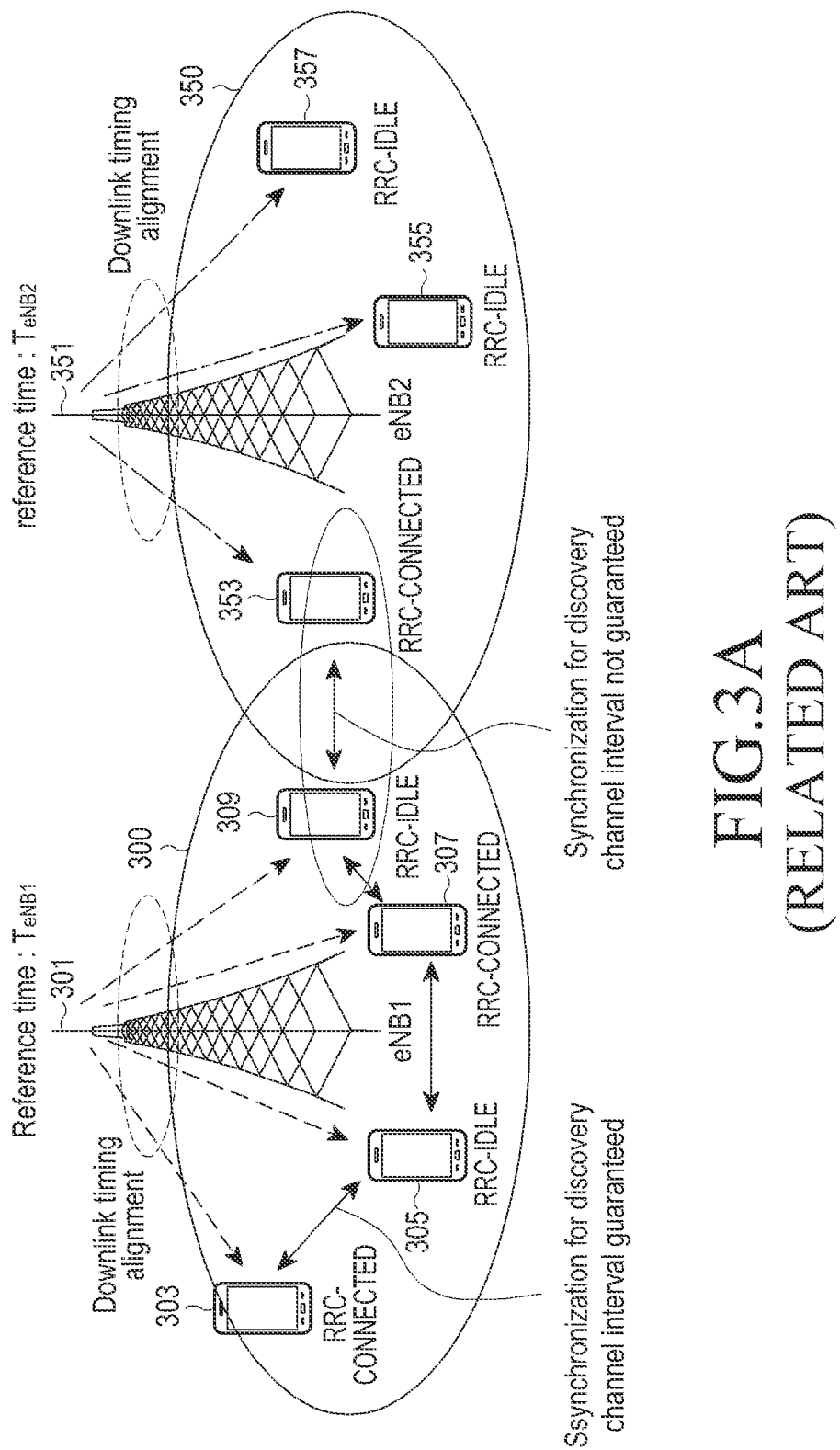
FIGS. 3A and 3B is a view illustrating an example in which an inter-cell Network Time Difference (NTD) occurs in a cellular communication system under an asynchronous network environment according to the related art.
Figure 3B:
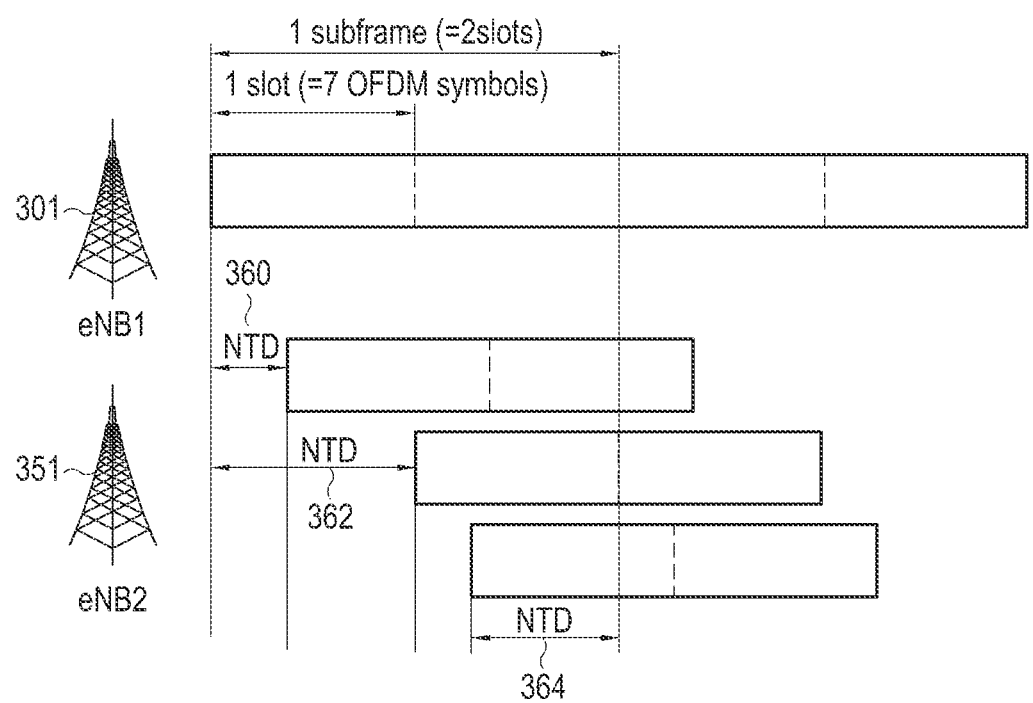
Figure 4:
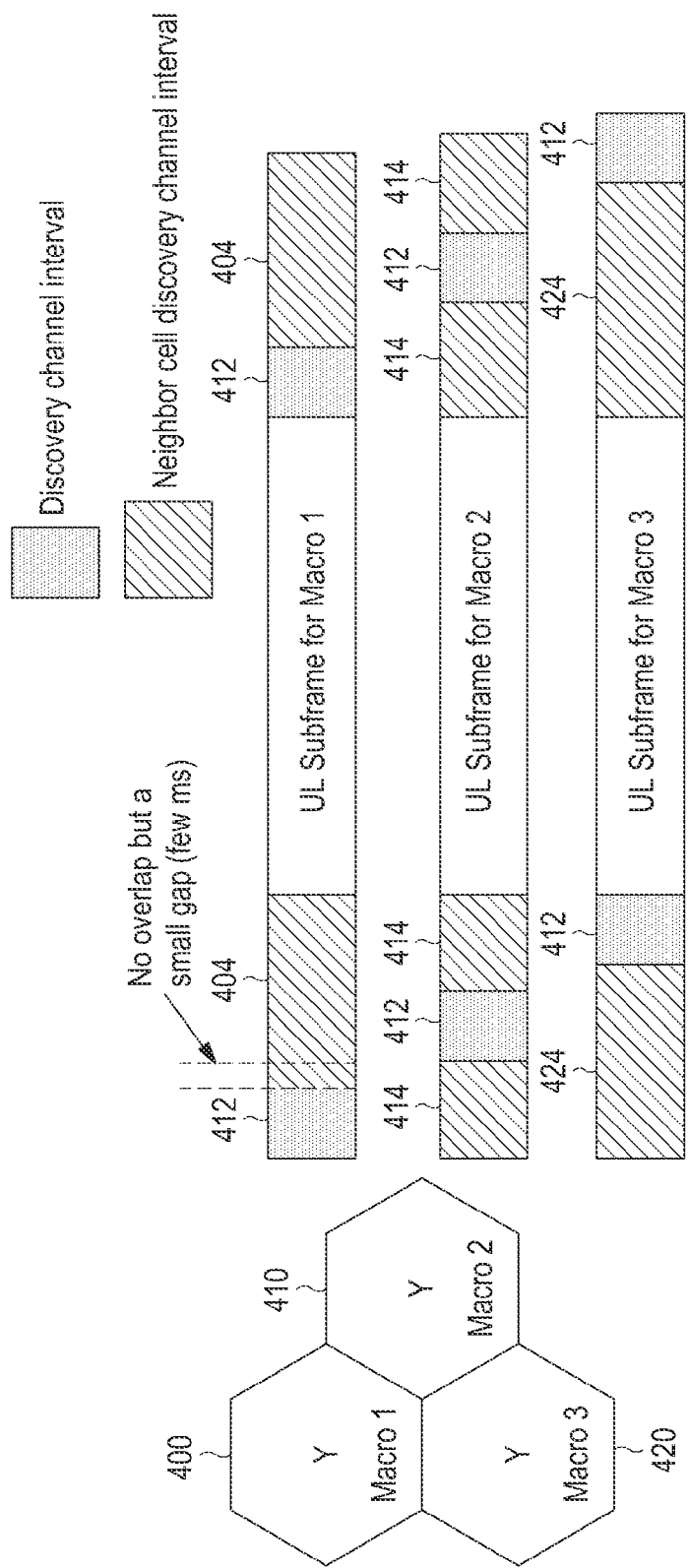
FIG. 4 is a view illustrating an example of aligning inter-cell discovery channel intervals in a cellular communication system under an asynchronous network environment according to the related art.
Figure 5:
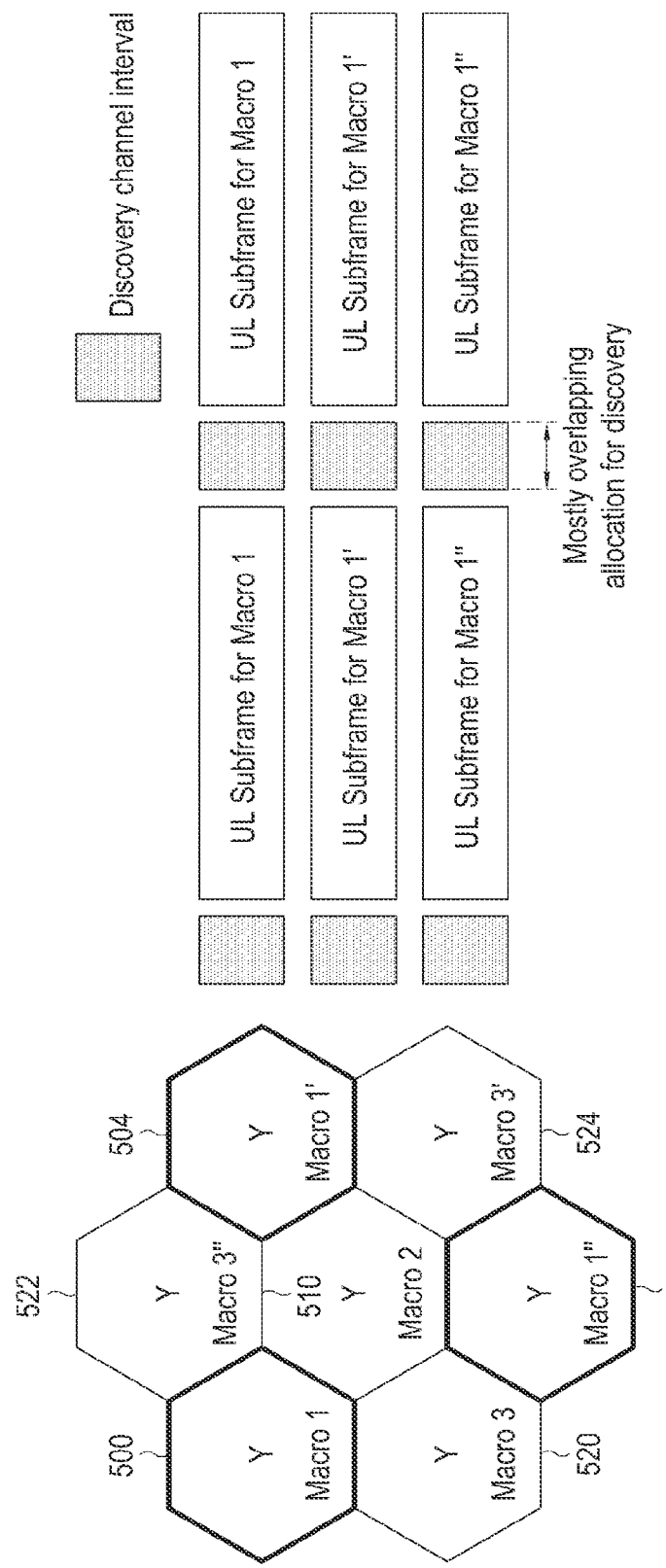
FIG. 5 is a view illustrating another example of aligning inter-cell discovery channel intervals in a cellular communication system under an asynchronous network environment according to the related art.
Figure 6:
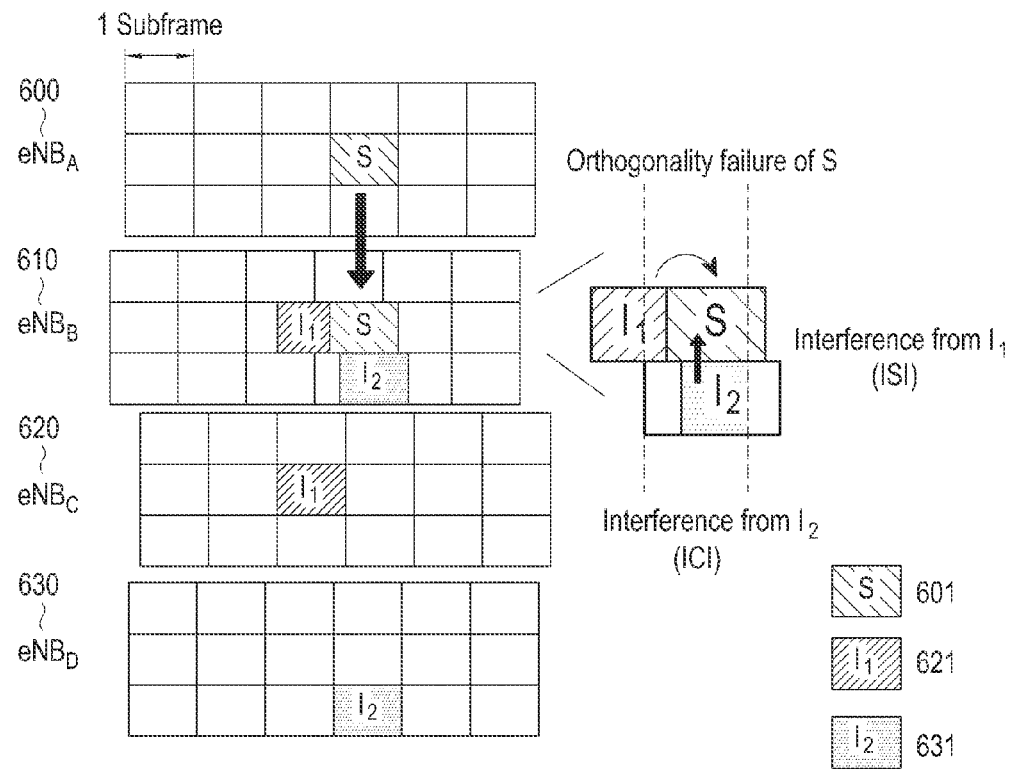
FIG. 6 is a view illustrating an example of a problem with a scheme for aligning discovery channel intervals on a subframe basis in a cellular communication system under an asynchronous network environment according to the related art.
Figure 7:
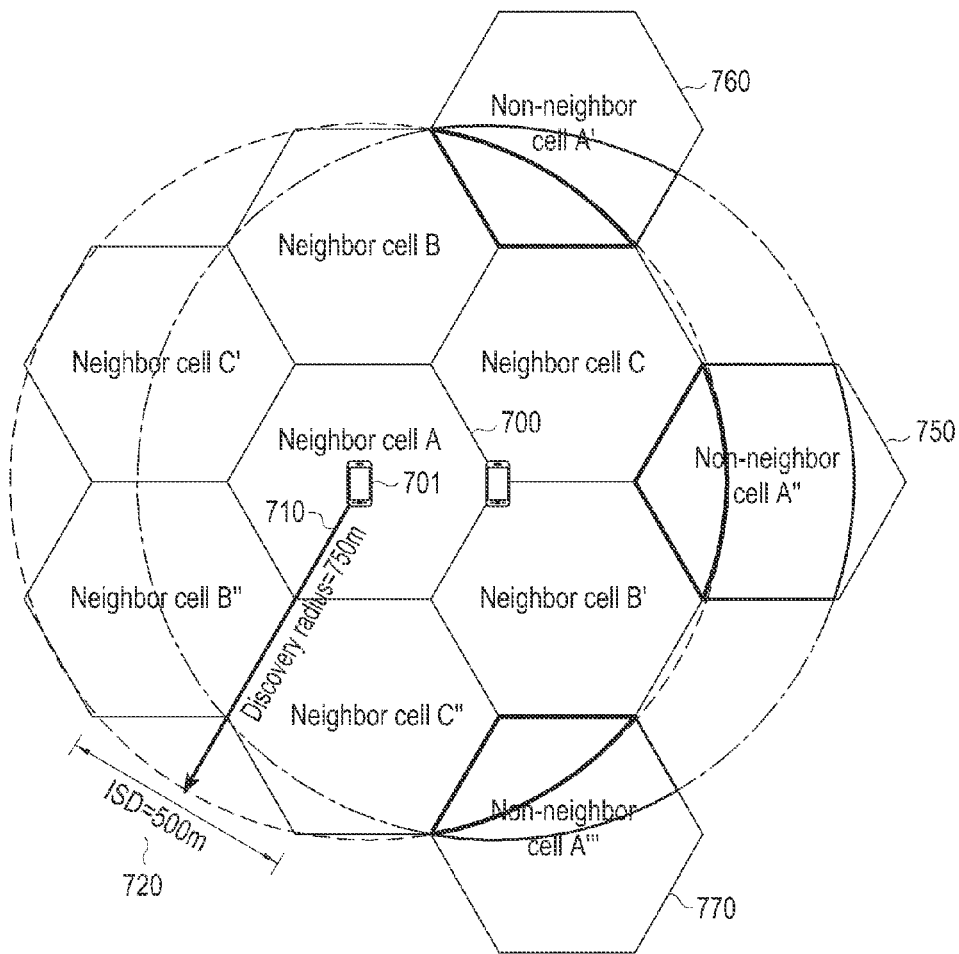
FIG. 7 is a view illustrating an example of interference incurred by a non-neighbor cell in a cellular communication system under an asynchronous network environment according to the related art.
Figure 8:
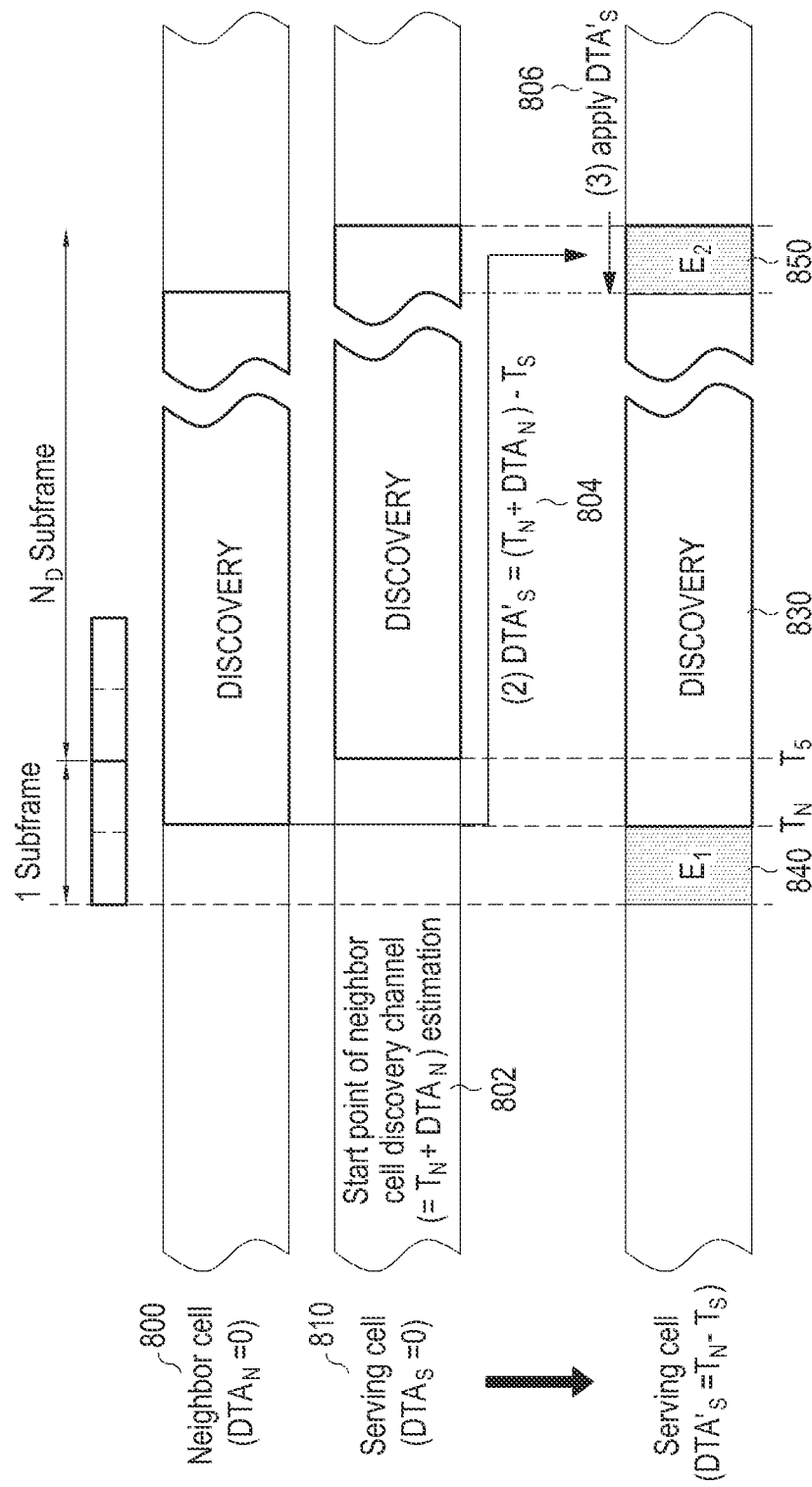
FIG. 8 is a frame configuration view illustrating an example of aligning inter-cell discovery channel intervals in a cellular communication system according to an embodiment of the present disclosure.

FIG. 8 is a frame configuration view illustrating an example of aligning inter-cell discovery channel intervals in a cellular communication system according to an embodiment of the present disclosure.

As an example, a scheme for aligning inter-cell discovery channel intervals under an asynchronous network environment is described with reference to FIG. 8, assuming that the cellular communication system includes a serving cell and a neighbor cell.

Referring to FIG. 8, T denotes a frame reference time, $T_N$ a frame reference time of the neighbor cell, and $T_S$ a frame reference time of the serving cell. The frame reference time is determined as a unique value of a cell, which is an absolute value.

Further, Discovery Timing Advance (DTA) denotes a temporally adjusted value obtained by shifting a discovery channel with respect to frame reference time T of a cell or eNB, $DTA_N$ a temporally adjusted value obtained by shifting a discovery channel with respect to $T_N$, and $DTA_S$ a temporally adjusted value obtained by shifting a discovery channel with respect to $T_S$. Here, assume that $DTA_N$ and $DTA_S$ for each of the neighbor cell 800 and the serving cell 810 are 0's.

Accordingly, all the eNBs allocate discovery channels with respect to a time obtained by reflecting DTA to reference time T. As an example, the start time of a discovery channel of UE j controlled by eNB i may be represented as $(T_i+DTA_i+d_{i-j})$ given the time of reception of a downlink synchronization signal. Here, $d_{i-j}$ denotes the distance between eNB i and UE j or a propagation delay due to the distance.

In order to align discovery channel intervals with the neighbor cell 800, the serving cell 810 first estimates a start point, $T_N+DTA_N$, for the discovery channel of the neighbor cell 800 at operation 802 and computes $DTA'_S$, which denotes a temporally adjusted value of the discovery channel of the serving cell 810 with respect to the start point $(T_N+DTA_N)$ for the discovery channel of the neighbor cell 800 at operation 804. $DTA'_S$ may be computed as in the following Equation 1:

$$DTA'_S = (T_N+DTA_N) - T_S \qquad \text{Equation 1}$$

In Equation 1, $T_N$ denotes the frame reference time of the neighbor cell, $DTA_N$ the temporally adjusted value obtained by shifting the discovery channel with respect to $T_N$, and $T_S$ the frame reference time of the serving cell.

The serving cell eNB, then, applies the computed $DTA'_S$ to $T_S$ of the serving cell at operation 806 to determine the start point of the discovery channel interval and aligns the discovery channel 830 based on the determined start point.

The above-described discovery channel aligning method considers a subframe basis on which scheduling is performed by an eNB in the LTE system. Accordingly, before and after the discovery channel 830 are created interval $E_1$ 840 and $E_2$ 850 where cellular communication scheduling is impossible, and the total sum of interval $E_1$ 840 and $E_2$ 850 always remains the same as one subframe. Further, intervals $E_1$ 840 and $E_2$ 850 may be utilized in various forms such as signal allocation and transmission for other purposes. In a case where the interval of the discovery channel 830 exactly matches the discovery channel interval of the neighbor cell 800, no interval occurs where cellular communication scheduling is impossible.

Figure 9:
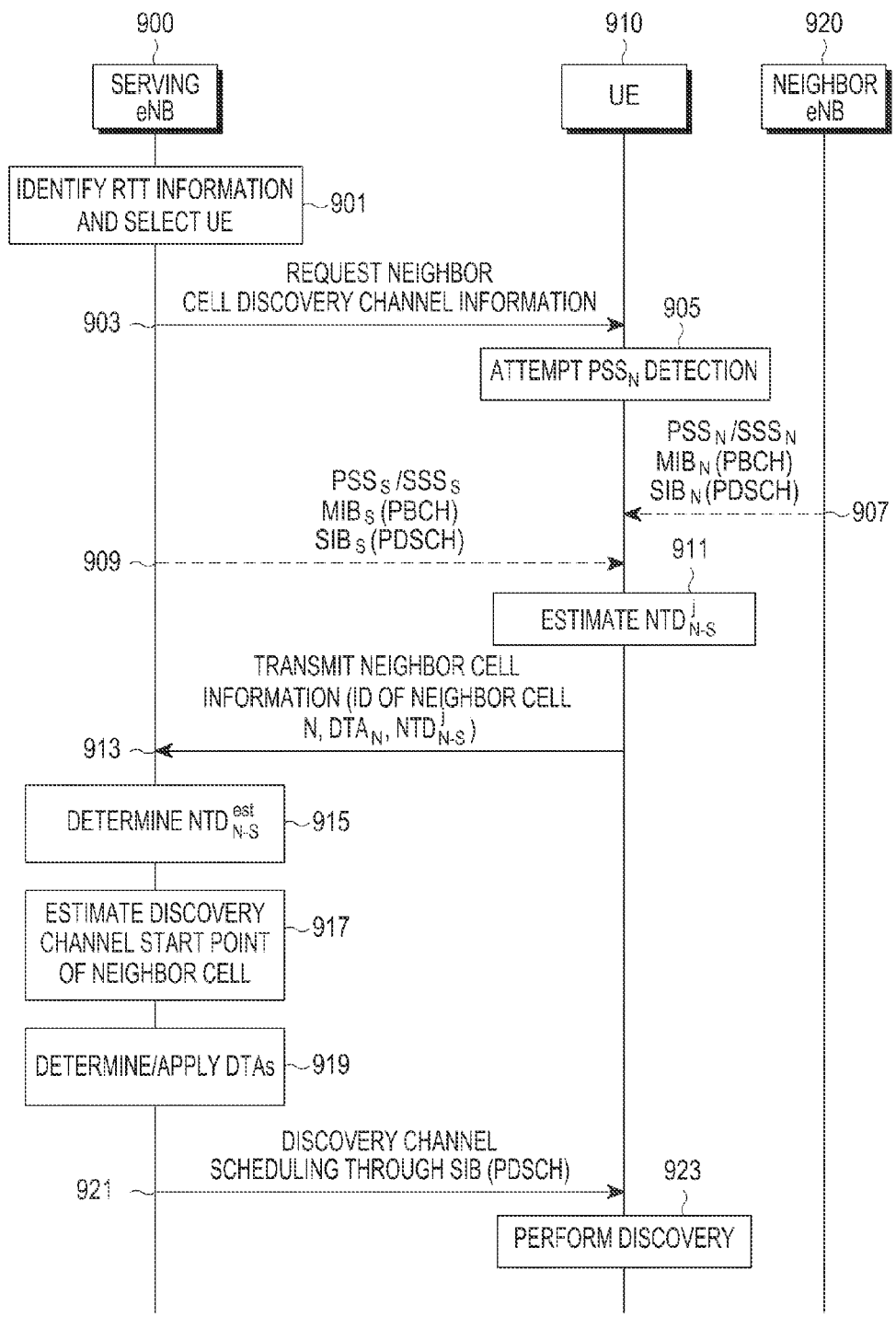
FIG. 9 is a flowchart illustrating an example of a procedure for aligning inter-cell discovery channel intervals based on a UE operating in Radio Resource Control (RRC) connected mode in a cellular communication system according to an embodiment of the present disclosure.

FIG. 9 is a flowchart illustrating an example of a procedure for aligning inter-cell discovery channel intervals based on a UE operating in RRC connected mode in a cellular communication system according to an embodiment of the present disclosure.

Referring to FIG. 9, assume that the cellular communication system includes a serving eNB 900, a UE 910, and a neighbor eNB 920 and that the UE 910 operates in RRC connected mode. The RRC connected mode refers to an operation mode of the UE 910 and denotes an operation mode in which the UE 910, after obtaining uplink synchronization with the serving eNB 900 and establishing a communication link, continues to perform communication. Hereinafter, the UE operating in RRC connected mode is denoted an RRC connected mode UE.

The serving eNB 900 identifies round trip time (RTT) information on the UEs operating in RRC connected mode and located in the cell, as obtained through a random access procedure and selects at least one UE to request to measure discovery channel information for the neighbor cell at operation 901. Here, the subsequent procedure is described under the assumption that the UE 910 has been chosen to be requested to measure the discovery channel information for the neighbor cell.

However, the serving eNB 900, at operation 901, may select a plurality of UEs. As an example, the serving eNB 900 may select top n RTT connected mode UEs with respect to the RRC connected mode UE with the maximum RTT value as UEs requested to measure the discovery channel information for the neighbor cell. The reason why the UEs with high RTT values are selected as UEs requested to measure the discovery channel information for the neighbor cell is that as RTT value increases, the UE becomes further away from the serving eNB 900, making it easier to detect a downlink synchronization signal, i.e., PSS detection, from the neighbor eNB 920 while minimizing the influence from an estimation error that may occur in the subsequent algorithm operation.

After selecting the UE 910 to be requested to measure the discovery channel information for the neighbor cell, the serving eNB 900 transmits a neighbor cell discovery channel information request message to the UE 910 to request the neighbor cell's PSS information and discovery channel-related information at operation 903. The neighbor cell discovery channel information request message may be transmitted through, e.g., a physical downlink control channel (PDCCH), physical downlink shared channel (PDSCH), or higher layer signaling.

The UE 910 attempts to detect $PSS_N$ of the neighbor eNB 920 received with the highest power except $PSS_S$ received from the serving eNB 900 at operation 905. Here, assume that the UE 910 succeeds in detection of $PSS_N$ of the neighbor eNB 920. However, in a case where the UE 910 is located at the center of the cell, the UE 910 may fail in the detection of $PSS_N$, and if so, the subsequent procedures are not performed.

Succeeding in the detection of $PSS_N$ of the neighbor eNB 920, the UE 910 may obtain the time of reception of downlink synchronization signal, $(T_N + d_{N-j})$. Here, $T_N$ denotes the frame reference time for the neighbor eNB 920, and $d_{N-j}$ denotes the distance between neighbor eNB N and UE j or a propagation delay due to the distance.

Thereafter, the UE 910 obtains the neighbor cell identifier (ID) managed by the neighbor eNB 920 by detecting $SSS_N$, a secondary synchronization signal (SSS) of the neighbor eNB 920. Further, the UE 910 detects $MIB_N$, a master information block (MIB) in the physical broadcasting channel (PBCH), and $SIB_N$, an SIB in the PDSCH, to thus obtain a temporally adjusted value, $DTA_N$, obtained by shifting the discovery channel with respect to the frame reference time $T_N$ of the neighbor eNB 920 at operation 907. That is, the UE 910 obtains three types of information (e.g., time of reception of downlink synchronization signal, $(T_N + d_{N-j})$, neighbor cell ID, and $DTA_N$, related to the discovery channel of the neighbor eNB 920 through operation 907.

Obtaining the discovery channel-related information for the neighbor eNB 920, the UE 910 performs reaccess to the serving eNB 900 to provide the discovery channel-related information obtained at operation 907. In this case, the UE 910 detects, e.g., $PSS_S$ and $SSS_S$, $MIB_S$ in the PBCH, and $SIB_S$ in the PDSCH, in order to obtain downlink synchronization with the serving eNB 900 and related system information, and through the same, the UE 910 may obtain the time of reception of downlink synchronization signal, $(T_S + d_{S-j})$, for $PSS_S$ of the serving eNB 900 at operation 909. Here, $T_S$ denotes the frame reference time for the serving eNB 900, and $d_{S-j}$ denotes the distance between serving eNB S and UE j or a propagation delay due to the distance.

Obtaining the time of reception of $PSS_N$, $(T_N + d_{N-j})$, of the neighbor eNB 920 and the time of reception of $PSS_S$, $(T_S + d_{S-j})$, of the serving eNB 900, the UE 910 estimates $NTD_{N-S}^j$ representing the time offset between the serving eNB 900 and the neighbor eNB 920 at operation 911. To estimate $NTD_{N-S}^j$, the following Equation 2 may be used:

$$NTD_{N-S}^j = [T_N + d_{N-j}] - [T_S + d_{S-j}] \quad \text{Equation 2}$$
$$= [T_N - T_S] + [d_{N-j} - d_{S-j}]$$
$$= [T_N - T_S] + e$$

In Equation 2, $[T_N - T_S]$ denotes an actual NTD between the serving eNB 900 and the neighbor eNB 920, and e denotes an NTD estimation error caused due to time delay $d_{N-j}$ between the neighbor eNB 920 and the UE 910 and time delay $d_{S-j}$ between the serving eNB 900 and the UE 910.

Thereafter, the UE 910 transmits neighbor cell information to the serving eNB 900 at operation 913. The neighbor cell information may be at least one of the neighbor cell ID and $DTA_N$ obtained at operation 907 and $NTD_{N-S}^f$ estimated at operation 911, and the neighbor cell information may be transmitted through, e.g., a PDCCH, PDSCH, or higher layer signaling. The operation in which the UE 910 operating in RRC connected mode feeds neighbor cell information back to the serving eNB 900 has been thus far described as an example. However, unless there is any RRC connected mode UE to feedback neighbor cell information, a UE operating in RRC idle mode may feedback the neighbor cell information to the serving eNB 900. An RRC idle mode UE has a state in which, after obtaining downlink synchronization with an eNB and related system information, the UE intermittently receives only control information. A procedure in which an RRC idle mode UE feeds neighbor cell information back to the serving eNB 900 is described below in further detail with reference to FIG. 11.

Receiving the neighbor cell information from the UE 910, the serving eNB 900 determines $NTD_{N-S}^j$ included in the received neighbor cell information as a representative NTD ($NTD_{N-S}^{est}$) at operation 915. Here, an example in which the serving eNB 900 receives neighbor cell information from a particular UE 910 has been described. However, in a case where the serving eNB 900 selects a plurality of UEs at operation 901, neighbor cell information may be received from the plurality of UEs. In such case, the serving eNB 900 groups, per cell ID, the neighbor cell information received from the plurality of UEs and then determines the NTD of UE x with the maximum RTT as a representative NTD ($NTD_{N-S}^{est}$). UE x with the maximum RTT is most likely to be located at the cell edge, and when a UE located at the cell edge, the distance between the UE and the serving eNB 900 is similar to the distance between the UE and the neighbor eNB 920, $(d_{N-x} \approx d_{S-x})$, so that the NTD estimation error, e, may be minimized.

As such, in a case where the serving eNB 900 receives neighbor cell information from a plurality of UEs, the finally estimated NTD between the neighbor eNB 920 and the serving eNB 900, $NTD_{N-S}^{est}$, may be represented as in the following Equation 3.

$$NTD_{N-S}^{est} = NTD_{N-S}^x, \text{ when } RTT(UE_x) > RTT(UE_j) \quad \text{Equation 3}$$

That is, in a case where the RTT of UE x is larger than the RTT of UE j, the serving eNB 900 determines the time offset, $NTD_{N-S}^x$, between the serving eNB 900 and the neighbor eNB 920 estimated by UE x as a representative NTD.

Determining the representative NTD $NTD_{N-S}^{est}$, the serving eNB 900 estimates the start point of the discovery channel for the neighbor cell managed by the neighbor eNB 920 based on $NTD_{N-S}^{est}$, DTAN of the neighbor cell, and the its own frame reference time TS at operation 917. The following Equation 4 may be used to estimate the start point of the discovery channel for the neighbor cell.

$$NTD_{N-S}^{est} + T_S + DTA_N = [T_N^{est} - T_S] + T_S + DTA_N = T_N^{est} + DTA_N \quad \text{Equation 4}$$

In Equation 4, $T_N^{est}$ denotes the frame reference time of the neighbor cell, particularly the frame reference time of the neighbor cell estimated by the UE with the maximum RTT. $DTA_N$ denotes the temporally adjusted value obtained by shifting the discovery channel with respect to frame reference time $T_N$ of the neighbor eNB 920.

The serving eNB 900 determines the final $DTA_S$ value based on the discovery channel start point of the neighbor cell computed through Equation 4 and applies the final $DTA_S$ value at operation 919.

The following Equation 5 may be used to determine the final $DTA_S$ value.

$$DTA_S = [T_N^{est} + DTA_N]^* - T_S \qquad \text{Equation 5}$$

In Equation 5, $T_N^{est}$ denotes the frame reference time of the neighbor cell estimated by the UE with the maximum RTT, $DTA_N$ the temporally adjusted value obtained by shifting the discovery channel with respect to frame reference time $T_N$ of the neighbor cell, and $T_S$ the frame reference time of the serving cell.

The serving eNB 900 then aligns its discovery channel interval in the discovery channel interval of the neighbor eNB 920. The final $DTA_S$ value may be determined as per a predetermined determination rule, which is described below in detail with reference to FIG. 12.

Thereafter, the serving eNB 900 schedules the discovery signal through the SIB at operation 921, and the UE 910 performs discovery on a counterpart UE at operation 923.

Figure 10:
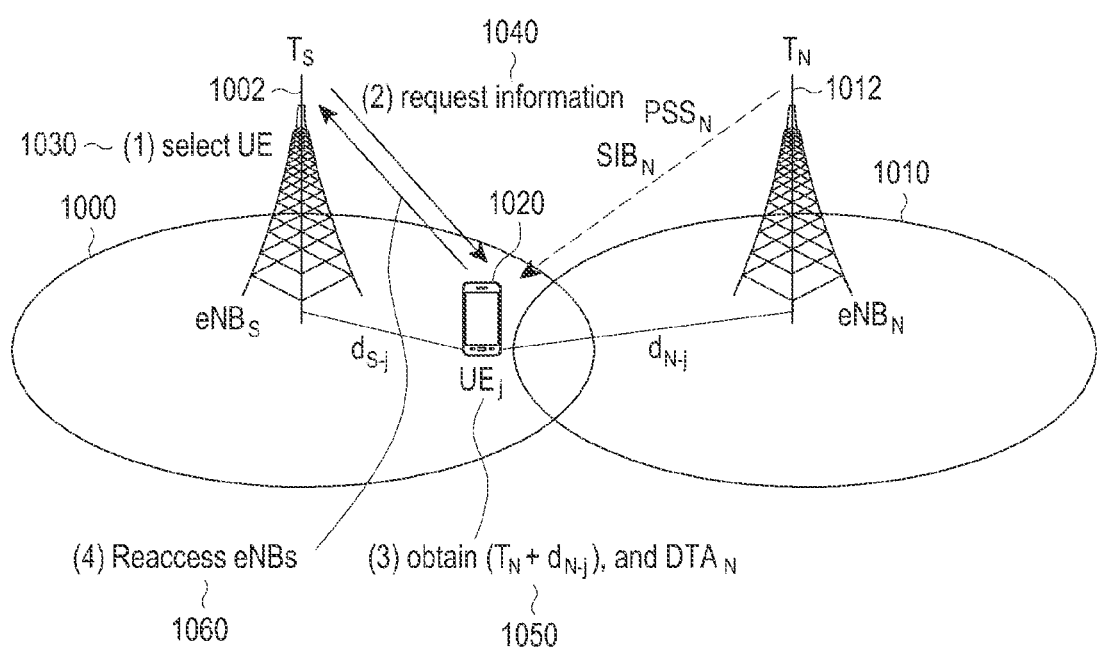
FIG. 10 is a system configuration view illustrating an example of a procedure for aligning inter-cell discovery channel intervals based on a UE operating in RRC connected mode in a cellular communication system according to an embodiment of the present disclosure.

FIG. 10 is a system configuration view illustrating an example of a procedure for aligning inter-cell discovery channel intervals based on a UE operating in RRC connected mode in a cellular communication system according to an embodiment of the present disclosure.

The example shown in FIG. 10 is similar to the example of aligning discovery channel intervals described above in connection with FIG. 9, and among others, the operation of operations 901 to 909 in FIG. 9 is described with reference to the system configuration view.

Referring to FIG. 10, assume that the cellular communication system includes a serving cell 1000 and a neighbor cell 1010 and that the serving cell 1000 includes a serving eNB (eNB$_S$) 1002 and UE j (UE$_j$) 1020, and the neighbor cell 1010 includes a neighbor eNB (eNB$_N$) 1012. Further assume that the UE j 1020 is an RRC connected mode UE. Still further assume that the distance between the serving eNB 1100 and UE j 1020 is defined as $d_{S-j}$, and the distance between the neighbor eNB 1012 and UE j 1020 is defined as $d_{N-j}$.

The serving eNB 1100 identifies RTT information on UEs operating in RRC connected mode and located in the cell, obtained through a random access procedure and selects UE j 1020 with the largest RTT as a UE to be requested to measure discovery channel information of the neighbor cell 1010 at operation 1030. The serving eNB 1002 then transmits a neighbor cell discovery information request message to UE j 1020 to request PSS information of the neighbor cell 1010 and discovery channel-related information at operation 1040.

UE j 1020 detects PSS$_N$ and SIB$_N$ from the neighbor eNB 1012 to obtain PSS$_N$ reception time ($T_N+d_{N-j}$) and DTA$_N$ at operation 1050. The UE then reaccesses the serving eNB 1002 to obtain PSS$_S$ reception time ($T_S+d_{S-j}$) at operation 1060.

Figure 11:
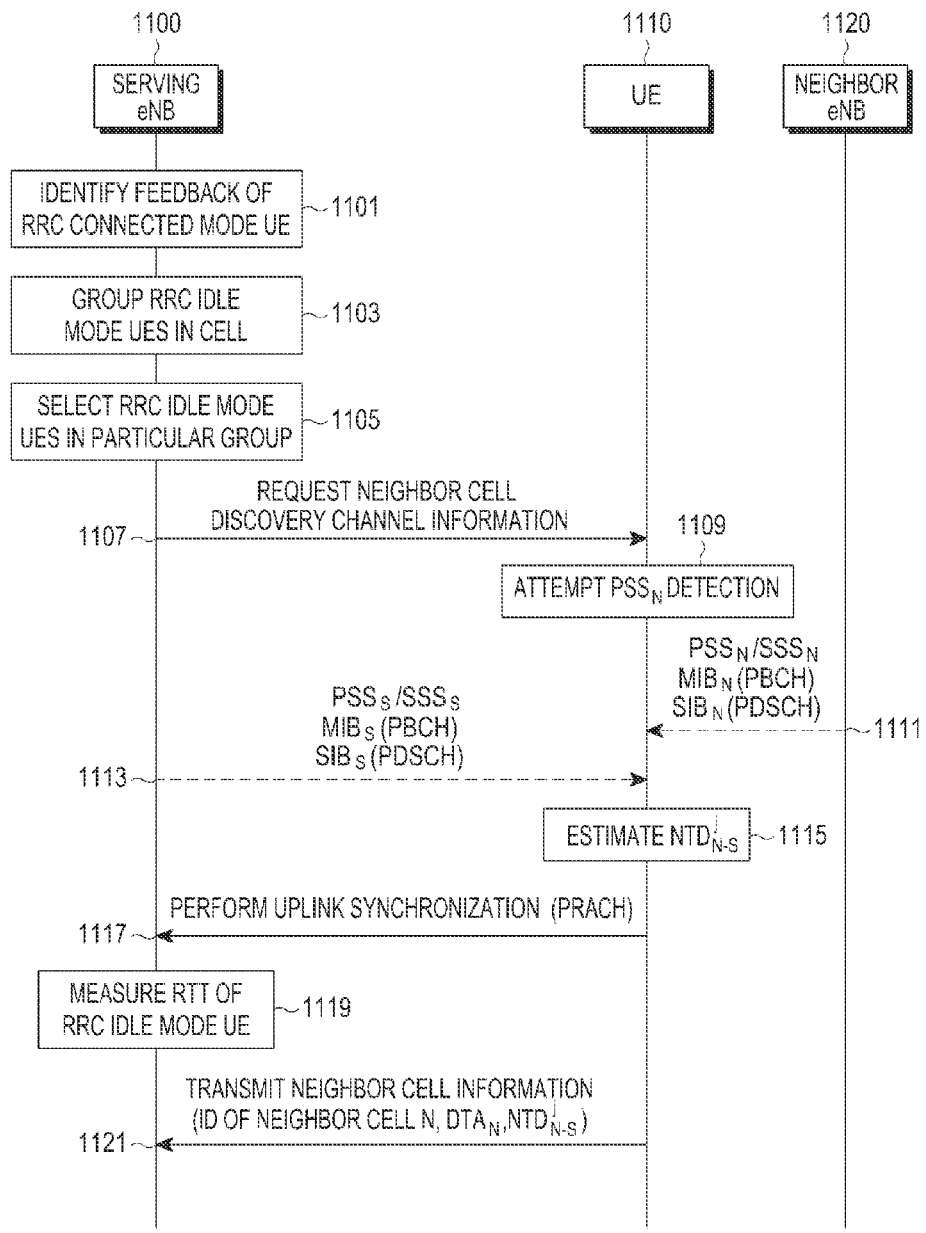
FIG. 11 is a flowchart illustrating an example of a procedure for aligning inter-cell discovery channel intervals based on a UE operating in RRC idle mode in a cellular communication system according to an embodiment of the present disclosure.

FIG. 11 is a flowchart illustrating an example of a procedure for aligning inter-cell discovery channel intervals based on a UE operating in RRC idle mode in a cellular communication system according to an embodiment of the present disclosure.

Referring to FIG. 11, assume that the cellular communication system includes a serving eNB 1100, a UE 1110, and a neighbor eNB 1120 and that the UE 1110 operates in RRC connected mode. Hereinafter, the UE operating in RRC connected mode is denoted an RRC connected mode UE.

The serving eNB 1100, after transmitting a neighbor cell discovery channel information request message to the RRC connected mode UE, identifies whether the neighbor cell information is fed back from the RRC connected mode UE at operation 1101. However, in a case where the neighbor cell information is not fed back within a predetermined time, the serving eNB 1100 determines that an RRC connected mode UE-based algorithm operation is impossible and performs a next step.

Since RRC idle mode UEs have not obtained uplink synchronization with an eNB, the serving eNB 1100 cannot identify RTT information for the RRC idle mode UEs. Accordingly, the serving eNB 1100 arranges the RRC idle mode UEs in the cell into a predetermined groups at operation 1103 and selects RRC idle mode UEs in a particular group at operation 1105. Here, assume that the UE 1110 is one of the selected RRC idle mode UEs.

The serving eNB 1100 transmits a neighbor cell discovery channel information request message to the RRC idle mode UEs in the particular group to request PSS information of the neighbor cell and discovery channel-related information at operation 1107. The neighbor cell discovery channel information request message may be transmitted through, e.g., a PDCCH, PDSCH or higher layer signaling.

The RRC idle mode UEs in the particular group, e.g., the UE 1110 attempts to detect PSS$_N$ of the neighbor eNB 1120 received with the highest power except PSS$_S$ received from the serving eNB 1100 at operation 1109. Here, assume that the UE 1110 succeeds in detection of PSS$_N$ of the neighbor eNB 1120. However, in a case where the UE 1110 is located at the center of the cell, the UE 1110 may fail in the detection of PSS$_N$, and if so, the subsequent procedures are not performed.

Succeeding in the detection of PSS$_N$ of the neighbor eNB 1120, the UE 1110 may obtain the downlink synchronization signal reception time ($T_N+d_{N-j}$). Here, $T_N$ denotes the frame reference time for the neighbor eNB 1120, and $d_{N-j}$ denotes the distance between neighbor eNB N and UE j or a propagation delay due to the distance.

Thereafter, the UE 1110 obtains the neighbor cell identifier (ID) managed by the neighbor eNB 1120 by detecting SSS$_N$ of the neighbor eNB 1120. Further, the UE 1110 detects MIB$_N$ in the PBCH and SIB$_N$ in the PDSCH, to thus obtain a temporally adjusted value, DTA$_N$, obtained by shifting the discovery channel with respect to the frame reference time $T_N$ of the neighbor eNB 1120 at operation 1111. That is, the UE 1110 obtains three types of information (e.g., time of reception of downlink synchronization signal, ($T_N+d_{N-j}$), neighbor cell ID, and DTA$_N$, related to the discovery channel of the neighbor eNB 1120 through operation 1111.

Obtaining the discovery channel-related information for the neighbor eNB 1120, the UE 1110 performs reaccess to the serving eNB 1100 to provide the discovery channel-related information obtained at operation 1111 to the serving eNB 1100. In this case, the UE 1110 detects, e.g., PSS$_S$ and SSS$_S$, MIB$_S$ in the PBCH, and SIB$_S$ in the PDSCH, in order to obtain downlink synchronization with the serving eNB 1100 and related system information, and through the same, the UE 1110 may obtain the time of reception of downlink synchronization signal, ($T_S+d_{S-j}$), for PSS$_S$ of the serving eNB 1100 at operation 1113. Here, $T_S$ denotes the frame reference time for the serving eNB 1100, and $d_{S-j}$ denotes the distance between serving eNB S and UE j or a propagation delay due to the distance.

Thereafter, the UE 1110 estimates representing the time offset between the serving eNB 1100 and the neighbor eNB 1120 based on the reception time $(T_N+d_{N-j})$ for $PSS_N$ of the neighbor eNB 1120 and the reception time $(T_S+d_{S-j})$ for $PSS_S$ of the serving eNB 1100 at operation 1115. The above-described Equation 2 may be used to estimate $NTD_{N-S}^j$.

Further, the UE 1110 performs uplink synchronization with the serving eNB 1100 through a physical radio access channel (PRACH) at operation 1117. The serving eNB 1100 upon obtaining uplink synchronization with the UE 1110 measures RTT information for RRC idle mode UEs at operation 1119.

Reaccessing the serving eNB 1100, the UE 1110 transmits neighbor cell information to the serving eNB 1100 at operation 1121. The neighbor cell information may be at least one of the neighbor cell ID and $DTA_N$ obtained at operation 1111 and $NTD_{N-S}^j$ estimated at operation 1115, and the neighbor cell information may be transmitted through, e.g., a PDCCH, PDSCH, or higher layer signaling. The operation in which the UE 1110 operating in RRC idle mode feeds neighbor cell information back to the serving eNB 1100 has been thus far described as an example. In a case where the neighbor cell information is not transmitted from any of the UEs included in the particular group selected at operation 1105, the serving eNB 1100 selects RRC mode UEs included in one of the remaining groups except the particular group among the groups of the predetermined number of groups and performs the procedure of operations 1107 to 1121 on the selected RRC mode UEs.

Further, although not shown, the serving eNB 1100, after receiving the neighbor cell information from the UE 1110, estimates the NTD between the neighbor eNB 1120 and the serving eNB 1100, $NTD_{N-S}^{est}$, and determines a final $DTA_S$. The operation of computing $NTD_{N-S}^{est}$ and determining the final $DTA_S$ is the same as that described above in connection with FIG. 9, and no further detailed description thereof is given.

Examples of the scheme for aligning inter-cell discovery channel intervals in a cellular communication system including two cells have been described in connection with FIGS. 8 to 11. A scheme for aligning inter-cell discovery channel intervals in a cellular communication system including three or more cells is described below in connection with FIG. 12.

Figure 12:
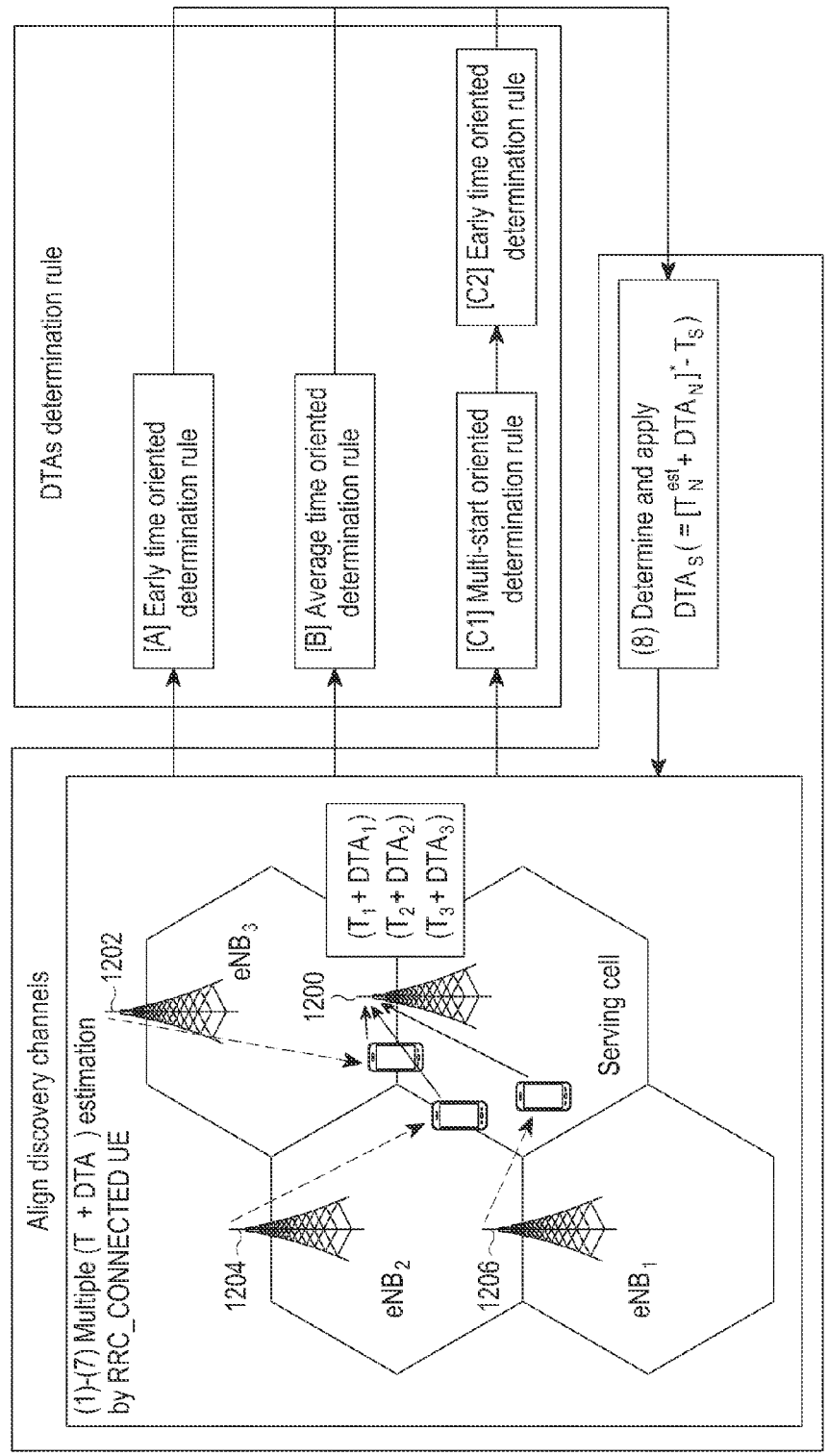
FIG. 12 is a illustrating an example of a procedure for aligning inter-cell discovery channel intervals based on a UE operating in RRC connected mode in a cellular communication system according to another embodiment of the present disclosure.

FIG. 12 is a illustrating an example of a procedure for aligning inter-cell discovery channel intervals based on a UE operating in RRC connected mode in a cellular communication system according to another embodiment of the present disclosure.

Referring to FIG. 12, assume that the cellular communication system includes a serving eNB 1200 and three neighbor eNBs, i.e., a first neighbor eNB (eNB$_1$) 1206, a second neighbor eNB (eNB$_2$) 1204, and a third neighbor eNB (eNB$_3$) 1202 and that UEs located in the serving cell and measuring discovery channel information of the neighbor cells are RRC connected mode UEs. Although an example of aligning inter-cell discovery channel intervals in a case where there are three neighbor cells is described in connection with FIG. 12, the discovery channel aligning method described in connection with FIG. 12 may apply likewise to any case where there are a plurality of neighbor cells.

The serving eNB 1200 sends a request for discovery channel-related information for the neighbor cells to each RRC connected mode UE located in the serving cell according to operations 901 to 913 of FIG. 9 and receives information on the neighbor cells from each UE. The serving eNB 1200 then estimates the start point of the discovery channel for the neighbor cells, and based on the start point $[T_N^{est}+DTA_N]^*$ of the discovery channel for the neighbor cells, determines a final $DTA_S$ according to operations 915 and 917 of FIG. 9.

Meanwhile, determination of an adjusted value, $DTA_S$, of the discovery channel start point of the serving cell based on the information $(T_N+DTA_N)$ obtained from Y neighbor cells follows the $DTA_S$ determination rule as described below. The $DTA_S$ determination rule includes: [A] early time oriented determination rule (early clock oriented method); [B] average time oriented determination rule; and [C] multi-time early time oriented determination rule.

[A] Early Time Oriented Determination Rule

The [A] early time oriented determination rule denotes a rule of aligning the discovery channel interval of the serving cell with the discovery channel start point with the earliest time among the respective discovery channel start points of the Y neighbor cells. Rule [A] presents the benefit of minimizing the influence from estimation error e by aligning the discovery channel interval of the serving cell based on the frame with the earliest start point.

As a computation equation as per rule [A], the following Equation 6 may be used.

$$[T_S^{est}+DTA_S]^* = T_k^{est}+DTA_k, \text{ if } (T_k^{est}+DTA_k) < (T_t^{est}+DTA_t) \quad \text{Equation 6}$$

In Equation 6, k,i denotes the index indicating an neighbor cell, $T_k^{est}$ the frame reference time of neighbor cell k estimated by the UE with the maximum RTT, $T_t^{est}$ the frame reference time of neighbor cell i estimated by the UE with the maximum RTT, $DTA_k$ the temporally adjusted value obtained by shifting the discovery channel with respect to frame reference time of neighbor cell k, and $DTA_i$ the temporally adjusted value obtained by shifting the discovery channel with respect to frame reference time $T_i$ of neighbor cell i.

[B] Average Time Oriented Determination Rule

The [B] Average time oriented determination rule denotes a rule of aligning the discovery channel interval of the serving cell with an average value of the respective discovery channel start points of the Y neighbor cells. That is, rule [B] is a scheme considering and reflecting equivalent weights of information that may be referenced.

As a computation equation as per rule [B], the following Equation 7 may be used.

$$[T_S^{est} + DTA_S]^* = \frac{1}{Y}\sum_{i=0}^{Y-1} (T_i^{est} + DTA_i) \quad \text{Equation 7}$$

In Equation 7, Y denotes the number of neighbor cells, $T_i^{est}$ the frame reference time of neighbor cell i estimated by the UE with the maximum RTT, and $DTA_i$ the temporally adjusted value obtained by shifting the discovery channel with respect to frame reference time $T_i$ of neighbor cell i.

[C] Multi-Time Early Time Oriented Determination Rule

Rule [C] comes with [C1] and [C2] that are sequentially applied. [C1] denotes a rule in which aligning is performed at the time of the group where more neighbor cells, among estimated times, earlier than at the other of the estimated times. [C2] denotes a rule in which, in a case where [C1] has been applied but there are two or more groups where the same number of neighbor cells are aligned, the discovery channel interval of the serving cell is aligned with the discovery channel start point with an earlier time. In other words, [C1] is a scheme in which in a case where multiple aligning groups occur, the discovery channel interval of the serving cell is aligned at the time of the group with more cells aligned, and this is a rule for preventing the channel aligning state of other eNBs from being spoiled by an asynchronous eNB that may irregularly occur. [C2] may be said to be a reference point for allowing the aligning times of discovery channels to converge in a predetermined direction while simultaneously minimizing the influence from estimation error e.

As an example, assuming that under the environment that the number (Y) of neighbor cells is 6, four of the neighbor cells have different discovery channel start points (t1, t2, t3, t4) and two have the same discovery channel start point (t5, t5), the serving eNB 1200 first applies rule [C1] and aligns the discovery channel start point of the serving cell at time t5 of the group where more neighbor cells are aligned.

As another example, assuming that there are a strap coupler aligning group constituted of two neighbor cells with the same discovery channel start point (t1, t1) and a discovery channel aligning group constituted of four neighbor cells with the same discovery channel start point (t2, t2, t2, t2), the serving eNB 1200 first applies rule [C1] and aligns the discovery channel start point of the serving cell with time t2 of the group where more neighbor cells are aligned.

As still another example, assuming that there are discovery channel aligning group 1 constituted of two neighbor cells with the same discovery channel start point (t1, t1), discovery channel aligning group 2 constituted of two neighbor cells with the same discovery channel start point (t2, t2), and discovery channel aligning group 3 constituted of two neighbor cells with the same discovery channel start point (t3, t3) and that the discovery channel start points come in the order of t1<t2<t3, where t1 comes earliest and t3 comes latest, the serving eNB 1200 applies rule [C1] first. However, since there are two or more groups each with the same number of neighbor cells aligned, the serving eNB 1200 applies the next rule, [C2], to align the discovery channel interval of the serving cell at discovery channel start point t1 that comes earlier than the others.

As yet still another example, assuming that there are six neighbor cells with different discovery channel start points (t1, t2, t3, t4, t5, t6) and that the discovery channel start points come in the order of t1<t2<t3<t4<t5<t6, where t1 comes earliest, and t6 comes latest, the serving eNB 1200 first applies rule [C1]. However, since it can be considered that there are two or more groups each with the same number of neighbor cells aligned, the serving eNB 1200 applies the next rule, [C2], to align the discovery channel interval of the serving cell at discovery channel start point t1 that comes earlier than the others.

Estimating the discovery channel start points for the neighbor cells through rule [A], [B], or [C] as described above, the serving eNB 1200 determines the final $DTA_S$ according to operation 919 of FIG. 9 and applies the same.

Figure 13:
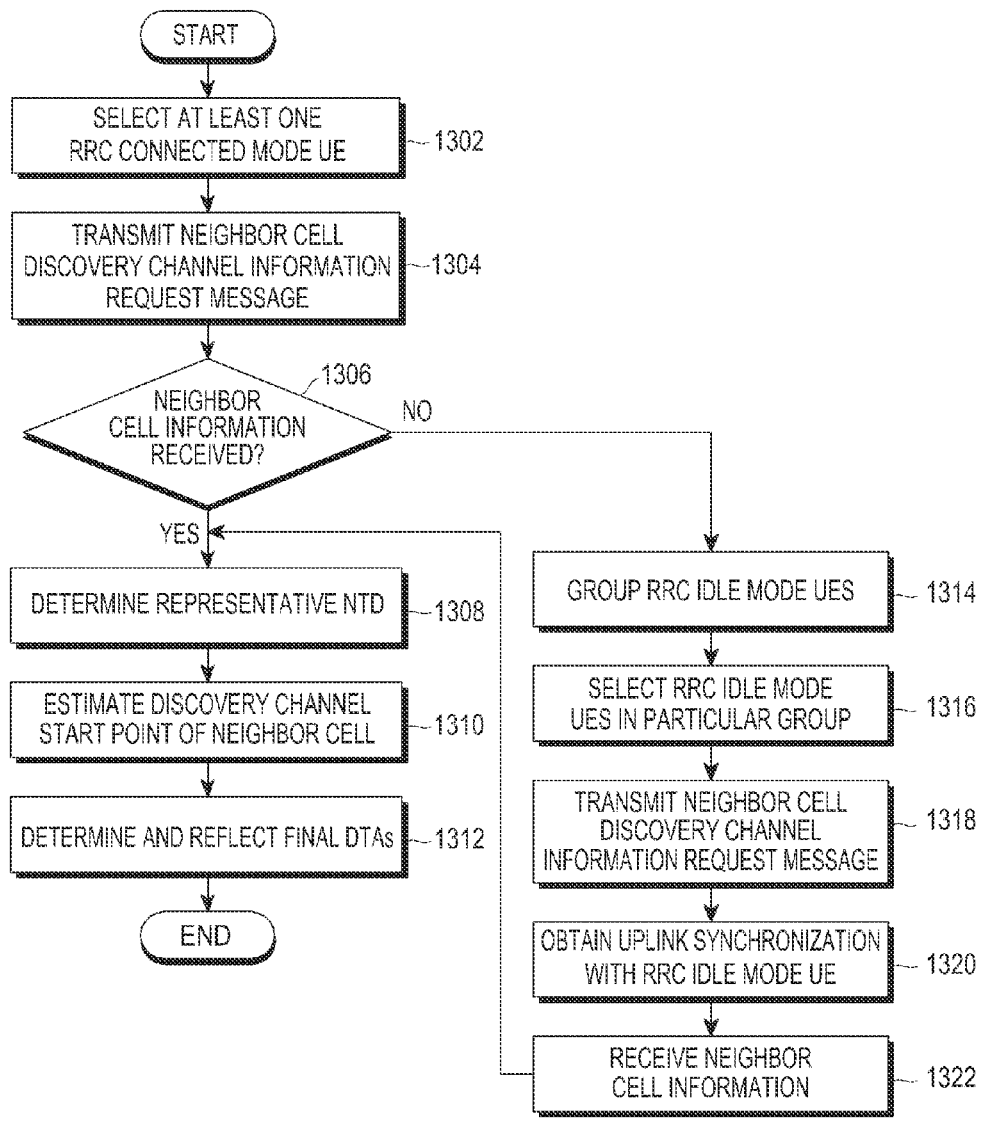
FIG. 13 is a flowchart illustrating an example in which a serving evolved NodeB (eNB) aligns inter-cell discovery channel intervals in a cellular communication system according to an embodiment of the present disclosure.

FIG. 13 is a flowchart illustrating an example in which a serving eNB aligns inter-cell discovery channel intervals in a cellular communication system according to an embodiment of the present disclosure.

Referring to FIG. 13, the serving eNB, at operation 1302, selects at least one RRC connected mode UE to be requested to measure discovery channel information for a neighbor cell based on RTT information for the RRC connected mode UE located in the serving cell. Here, the RTT information is obtained through a random access procedure.

The serving eNB, at operation 1304, transmits a neighbor cell discovery channel information request message to the at least one selected RRC connected mode UE to request PSS information of the neighbor cell and discovery channel-related information. The neighbor cell discovery channel information request message may be transmitted through, e.g., a PDCCH, PDSCH or higher layer signaling.

The serving eNB, at operation 1306, identifies whether neighbor cell information is received from the at least one RRC connected mode UE in response to the neighbor cell discovery channel information request message. The neighbor cell information may be at least one of neighbor cell ID, $DTA_N$ and $NTD_{N-S}^j$, and the neighbor cell information may be transmitted through, e.g., a PDCCH, PDSCH, or higher layer signaling.

In a case where it is identified at operation 1306 that the neighbor cell information is received from the at least one RRC connected mode UE, the serving eNB performs operation 1308 to determine a representative NTD. In this case, the serving eNB determines the representative NTD through the above-described Equation 3.

The serving eNB, at operation 1310, estimates the discovery channel start point of the neighbor cell based on the representative NTD, $DTA_N$, and $T_S$. In this case, the serving eNB may estimate the discovery channel start point of the neighbor cell through the above-described Equation 4.

The serving eNB, at operation 1312, determines the final $DTA_S$ based on the discovery channel start point of the neighbor cell and applies the final $DTA_S$ to align the discovery channel interval of the serving cell in the discovery channel interval of the neighbor cell. In this case, the serving eNB determines the final $DTA_S$ through the above-described Equation 5.

In a case where it is identified at operation 1306 that the neighbor cell information is not received from the at least one RRC connected mode UE, however, the serving cell performs operation 1314 to bundle the RRC idle mode UEs located in the serving cell into a predetermined groups.

The serving eNB, at operation 1316, selects RRC idle mode UEs included in a particular group among the predetermined number of groups, and at operation 1318, transmits a neighbor cell discovery channel information request message to the selected RRC idle mode UEs. The neighbor cell discovery channel information request message may be transmitted through, e.g., a PDCCH, PDSCH or higher layer signaling.

The serving eNB, at operation 1320, obtains uplink synchronization with the RRC idle mode UEs. The serving eNB, at operation 1322, receives neighbor cell information from the RRC idle mode UEs, and advances to operation 1308 to perform subsequent procedures. The neighbor cell information may be at least one of neighbor cell ID, $DTA_N$ and $NTD_{N-S}^j$, and the neighbor cell information may be transmitted through, e.g., a PDCCH, PDSCH, or higher layer signaling.

Figure 14:
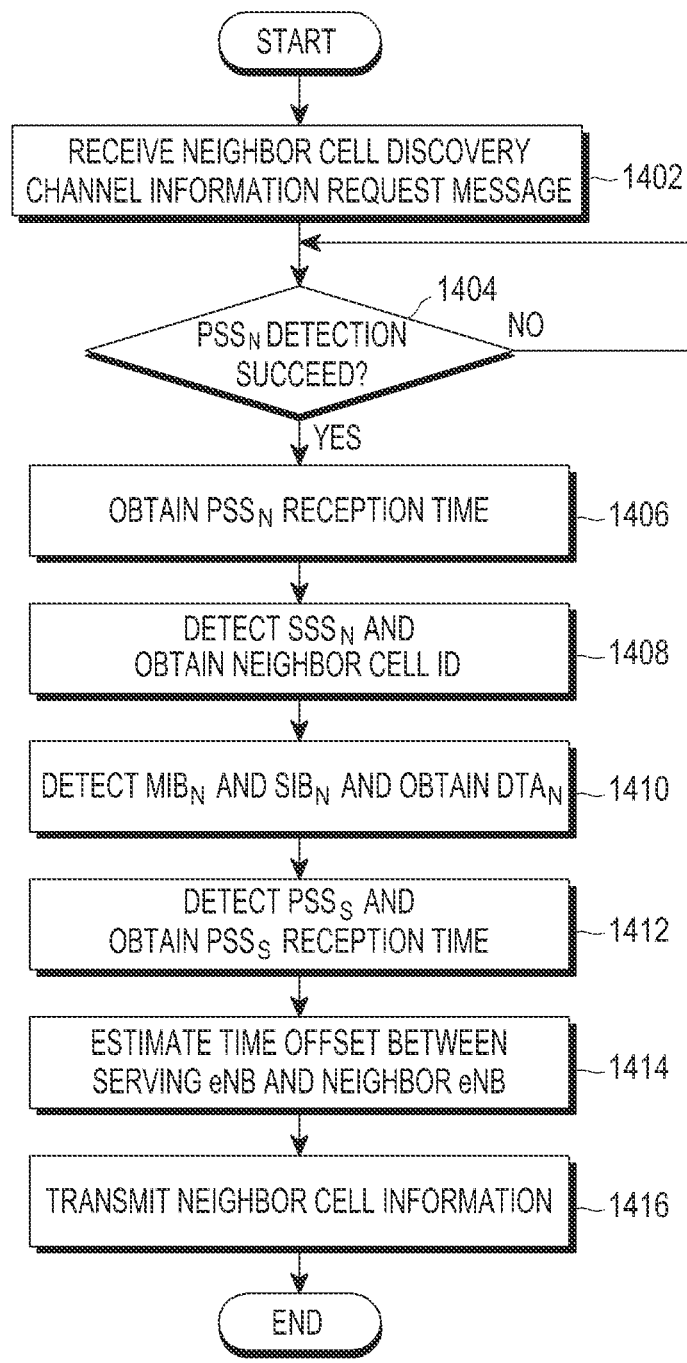
FIG. 14 is a flowchart illustrating an example in which a UE aligns inter-cell discovery channel intervals in a cellular communication system according to an embodiment of the present disclosure.

FIG. 14 is a flowchart illustrating an example in which a UE aligns inter-cell discovery channel intervals in a cellular communication system according to an embodiment of the present disclosure.

Referring to FIG. 14, upon receiving the neighbor cell discovery channel information request message from the serving eNB at operation 1402, the UE performs operation 1404 to identify whether detection of $PSS_N$ of the neighbor eNB has succeeded. Here operation 1404 is repeatedly performed until the detection of $PSS_N$ is successful. Further, the neighbor cell discovery channel information request message denotes a message for requesting PSS information of the neighbor cell and discovery channel-related information, and the neighbor cell discovery channel information request message may be transmitted through, a PDCCH, PDSCH, or higher layer signaling.

In a case where it is identified at operation 1404 that $PSS_N$ detection is successful, the UE performs operation 1406 to obtain the reception time of $PSS_N$. The UE, at operation 1408, detects $SSS_N$ of the neighbor eNB to obtain the neighbor cell ID. The UE, at operation 1410, detects $MIB_N$ in the PBCH and $SIB_N$ in the PDSCH to obtain $DTA_N$.

The UE, at operation 1412, detects $PSS_S$ of the serving eNB to obtain the reception time of $PSS_S$. The UE, at operation 1414, estimates the time offset, $NTD_{N-S}^j$, between the serving eNB and the neighbor eNB based on the reception time of $PSS_N$ and the reception time of $PSS_S$. In this case, the UE estimates $NTD_{N-S}^j$ through the above-described Equation 2.

The UE, at operation 1416, transmits neighbor cell information to the serving eNB. The neighbor cell information may be at least one of neighbor cell ID, $DTA_N$ and $NTD_{N-S}^j$, and the neighbor cell information may be transmitted through, e.g., a PDCCH, PDSCH, or higher layer signaling.

Although the operation in which the RRC connected mode UE aligns the inter-cell discovery channel intervals has been described in connection with FIG. 14, for example, the operation described in connection with FIG. 14 may also apply to idle mode UEs. However, in a case where the operation of FIG. 14 is performed by an idle mode UE, the idle mode UE performs operations 1402 to 1414 in the same manner as the RRC connected mode UE, but unlike the RRC connected mode UE, the idle mode UE performs operation 1416 after obtaining uplink synchronization with the serving eNB.

Figure 15:
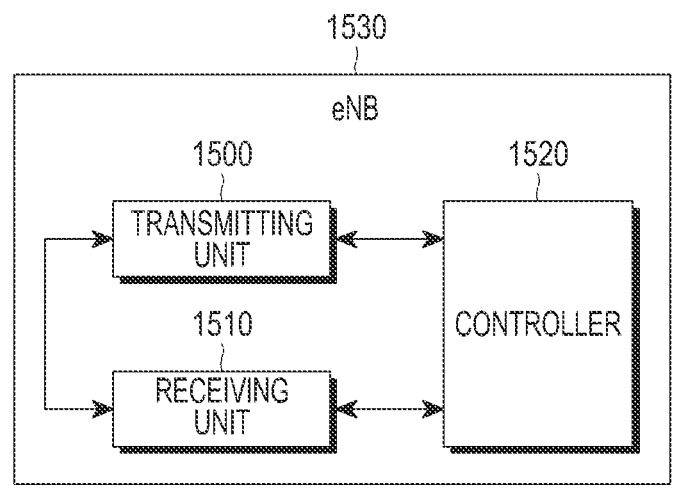
FIG. 15 is a block diagram illustrating an eNB aligning inter-cell discovery channel intervals in a cellular communication system according to an embodiment of the present disclosure.

FIG. 15 is a block diagram illustrating an eNB aligning inter-cell discovery channel intervals in a cellular communication system according to an embodiment of the present disclosure.

Referring to FIG. 15, the eNB 1530 includes a transmitting unit 1500, a receiving unit 1510, and a controller 1520. The eNB 1530 may be, e.g., a serving eNB.

The controller 1520 selects at least one RRC connected mode UE to be requested to measure discovery channel information for a neighbor cell based on RTT information for the RRC connected mode UE located in the serving cell. Here, the RTT information is obtained through a random access procedure.

The transmitting unit 1500 transmits a neighbor cell discovery channel information request message to the at least one RRC connected mode UE selected by the controller 1520 to request PSS information of the neighbor cell and discovery channel-related information. The neighbor cell discovery channel information request message may be transmitted through, e.g., a PDCCH, PDSCH or higher layer signaling.

The controller 1520 identifies whether neighbor cell information is received from the at least one RRC connected mode UE in response to the neighbor cell discovery channel information request message. The neighbor cell information may be at least one of neighbor cell ID, $DTA_N$ and $NTD_{N-S}^j$, and the neighbor cell information may be transmitted through, e.g., a PDCCH, PDSCH, or higher layer signaling. In a case where it is identified that the neighbor cell information is received from the at least one RRC connected mode UE through the receiving unit 1510, the controller 1520 determines a representative NTD and estimates the discovery channel start point of the neighbor cell based on the representative NTD, $DTA_N$, and $T_S$. The controller 1520 then determines the final $DTA_S$ based on the discovery channel start point of the neighbor cell and applies the final $DTA_S$ to align the discovery channel interval of the serving cell in the discovery channel interval of the neighbor cell.

Meanwhile, in a case where it is identified that the neighbor cell information is not received from the at least one RRC connected mode UE, the controller 1520 bundles the RRC idle mode UEs located in the serving cell into a predetermined groups. The controller 1520 then selects RRC idle mode UEs included in a particular group among the predetermined number of groups and transmits a neighbor cell discovery channel information request message to the selected RRC idle mode UEs through the transmitting unit 1500. The neighbor cell discovery channel information request message may be transmitted through, e.g., a PDCCH, PDSCH or higher layer signaling.

The controller 1520, after obtaining uplink synchronization with the RRC idle mode UEs, receives neighbor cell information from the RRC idle mode UEs through the receiving unit 1510. The neighbor cell information may be at least one of neighbor cell ID, $DTA_N$ and $NTD_{N-S}^j$, and the neighbor cell information may be transmitted through, e.g., a PDCCH, PDSCH, or higher layer signaling.

Figure 16:
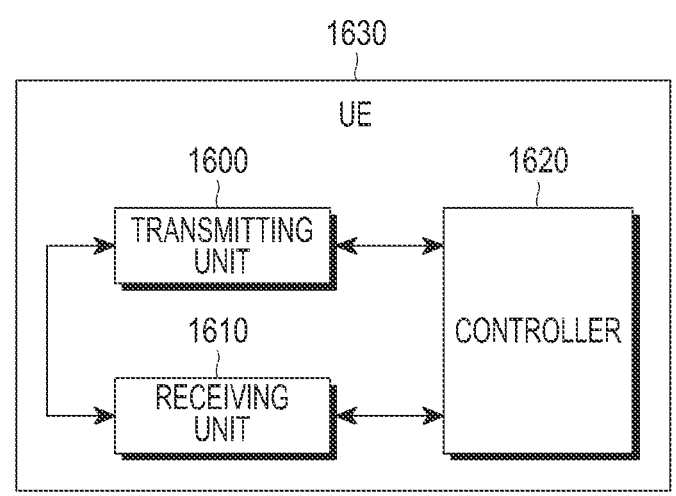
FIG. 16 is a block diagram illustrating a UE aligning inter-cell discovery channel intervals in a cellular communication system according to an embodiment of the present disclosure.

FIG. 16 is a block diagram illustrating a UE aligning inter-cell discovery channel intervals in a cellular communication system according to an embodiment of the present disclosure.

Referring to FIG. 16, the UE 1630 includes a transmitting unit 1600, a receiving unit 1610, and a controller 1620.

The controller 1620, upon receiving the neighbor cell discovery channel information request message from the serving eNB through the receiving unit 1610, identifies whether detection of $PSS_N$ of the neighbor eNB has succeeded. The controller 1620 repeatedly identifies whether the detection of $PSS_N$ of the neighbor eNB succeeds until the $PSS_N$ detection is successful. The neighbor cell discovery channel information request message denotes a message for requesting PSS information of the neighbor cell and discovery channel-related information, and the neighbor cell discovery channel information request message may be transmitted through, e.g., a PDCCH, PDSCH, or higher layer signaling.

The controller 1620, in a case where the $PSS_N$ detection succeeds, performs operation 1406 to obtain the reception time of $PSS_N$, detects $SSS_N$ of the neighbor eNB to obtain the neighbor cell ID, and detects $MIB_N$ in the PBCH and $SIB_N$ in the PDSCH to obtain $DTA_N$. Further, the controller 1620 detects $PSS_S$ of the serving eNB to obtain the reception time of $PSS_S$. The controller 1620 then estimates the time offset, $NTD_{N-S}^j$, between the serving eNB and the neighbor eNB based on the reception time of $PSS_N$ and the reception time of $PSS_S$.

The transmitting unit 1600 transmits neighbor cell information to the serving eNB. The neighbor cell information may be at least one of neighbor cell ID, $DTA_N$ and $NTD_{N-S}^j$, and the neighbor cell information may be transmitted through, e.g., a PDCCH, PDSCH, or higher layer signaling.

Although the operation in which the RRC connected mode UE aligns the inter-cell discovery channel intervals has been described in connection with FIG. 16, for example, the configuration of the UE illustrated in FIG. 16 may also apply to idle mode UEs. However, in a case where the configuration shown in FIG. 16 applies to an idle mode UE, the controller 1620 performs an additional operation for obtaining uplink synchronization with the serving eNB.

Figure 17:
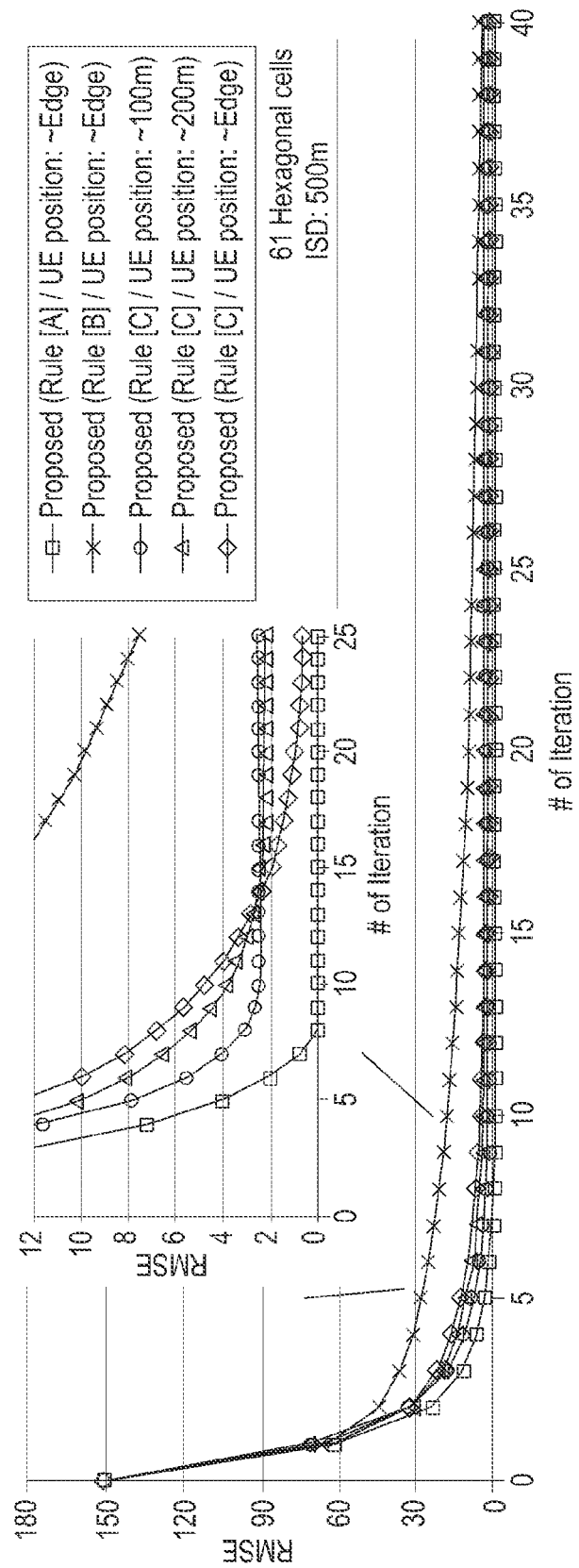
FIG. 17 is a graph illustrating the synchronization tracking performance between multiple cells upon applying a Discovery Timing Advance ($DTA_S$) determination rule according to an embodiment of the present disclosure.

FIG. 17 is a graph illustrating the synchronization tracking performance between multiple cells upon applying a $DTA_S$ determination rule according to an embodiment of the present disclosure.

Referring to FIG. 17, the graph assumes the environment where ISD is 500 m and shows the performance obtained by analyzing channel aligning tracking between 61 cells. In the graph, the horizontal axis denotes the number of times of repeating the procedure of aligning inter-cell discovery channel intervals according to an embodiment of the present disclosure, and the vertical axis denotes root mean square errors (RMSEs).

As evident from the graph, discovery channel aligning may be performed within an error of a few samples between multiple cells through the $DTA_S$ determination rule according to an embodiment of the present disclosure. In particular, rule [A] presents a fastest and most accurate tracking performance, and rule [C] allows the RMSE of the discovery channel start points of the multiple cell eNBs to converge into a few samples or less even in a case where there is no UE positioned at the cell edge and thus estimation error e increases. For example, when UEs are present only within a radius of 100 m from the eNB, there may be no UE at the cell edge.

Figure 18:
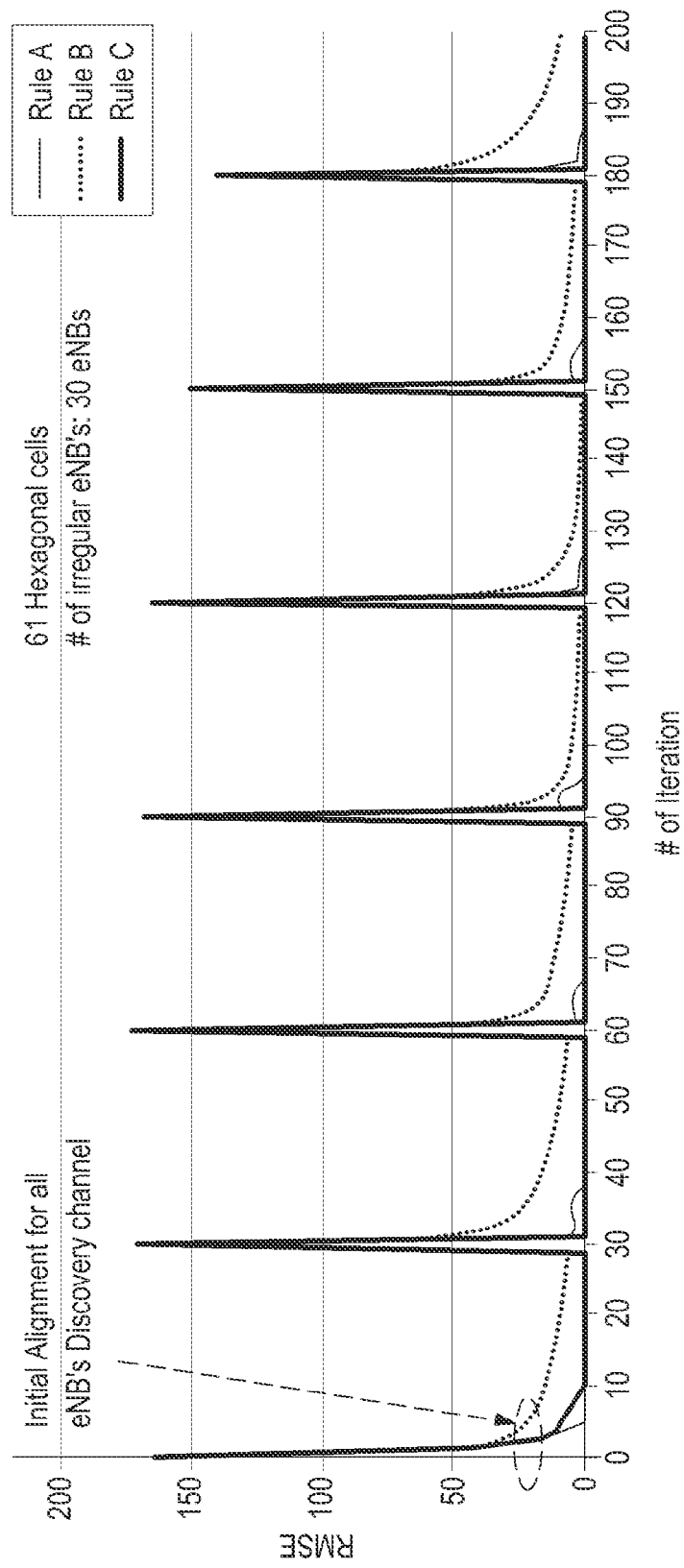
FIG. 18 is a graph illustrating the synchronization tracking performance between multiple cells upon applying a $DTA_S$ determination rule under an environment where an asynchronous cell abruptly occurs according to an embodiment of the present disclosure.

FIG. 18 is a graph illustrating the synchronization tracking performance between multiple cells upon applying a $DTA_S$ determination rule under an environment where an asynchronous cell abruptly occurs according to an embodiment of the present disclosure.

Referring to FIG. 18, the graph shows the performance obtained by analyzing channel aligning tracking between 61 cells. In the graph, the horizontal axis denotes the number of times of repeating the procedure of aligning inter-cell discovery channel intervals according to an embodiment of the present disclosure, and the vertical axis denotes root mean square errors (RMSEs).

As can be seen from the graph, even when a particular eNB, after obtaining synchronization, loses the synchronization time for whatever reason, the $DTA_S$ determination rule, [C], according to an embodiment of the present disclosure, immediately responds, thus enabling discovery channel aligning. In contrast, as per rules [C] and [B], jitter may be created for a constant time when an asynchronous eNB with an early frame time occurs, and its influence may increase as more cells participate in synchronization.

Meanwhile, the procedure of aligning inter-cell discovery channel intervals according to an embodiment of the present disclosure is repeatedly performed only upon initial booting by each eNB, but it is not repeated at every discovery period. Thus, overhead on the side of UE/eNB is negligible. Further, after the initial synchronization, the procedure may be performed aperiodically at the request of the UE only an asynchronous eNB occurs. This may be achieved in such a form that, when sensing a reduction in discovery performance to a predetermined level or less, the UEs in the cell requests the eNB to realign discovery channels.

Figure 19:
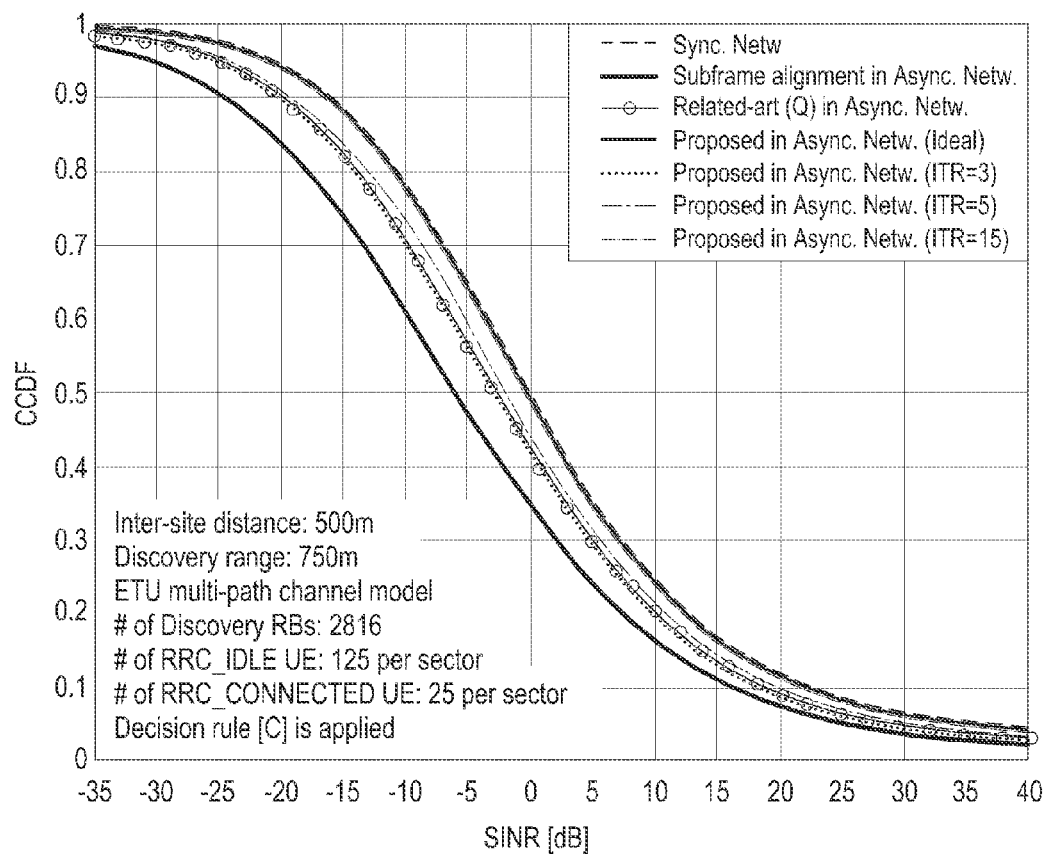
FIG. 19 is a graph illustrating a UE's signal to interference-plus-noise ratio (SINR) performance depending on the number of times of repetition of a procedure for aligning inter-cell discovery channel intervals according to an embodiment of the present disclosure.

FIG. 19 is a graph illustrating a UE's SINR performance depending on the number of times of repetition of a procedure for aligning inter-cell discovery channel intervals according to an embodiment of the present disclosure.

Referring to FIG. 19, the graph shows Complement Cumulative Distribution Function (CCDF) performance of discovery signal reception SINR of a UE for each for a method for aligning discovery channel intervals on a subframe basis (Subframe alignment, hereinafter denoted a 'first method'), a related-art discovery channel interval aligning method of allocating the respective discovery channel intervals for neighbor cells not to overlap between the cells (related-art, hereinafter denoted a 'second method'), and a discovery channel aligning method according to an embodiment of the present disclosure (Proposed, hereinafter denoted a 'third method').

As evident from the graph, the first method presents, on average, about 6 dB of reception SINR performance deterioration relative to synchronous network environment due to orthogonality failure of discovery signals and interference signals, and the second method also presents, on average, about 3 dB of reception SINR performance deterioration relative to synchronous network environment due to interference from non-neighbor cells.

In contrast, it can be seen that the third method according to the present disclosure, upon applying rule [C] for inter-cell discovery channel aligning, allow for SINR performance similar to that according to the second method when repeated three times and SINR performance similar to that of synchronous network environment when repeated 15 times.

Figure 20:
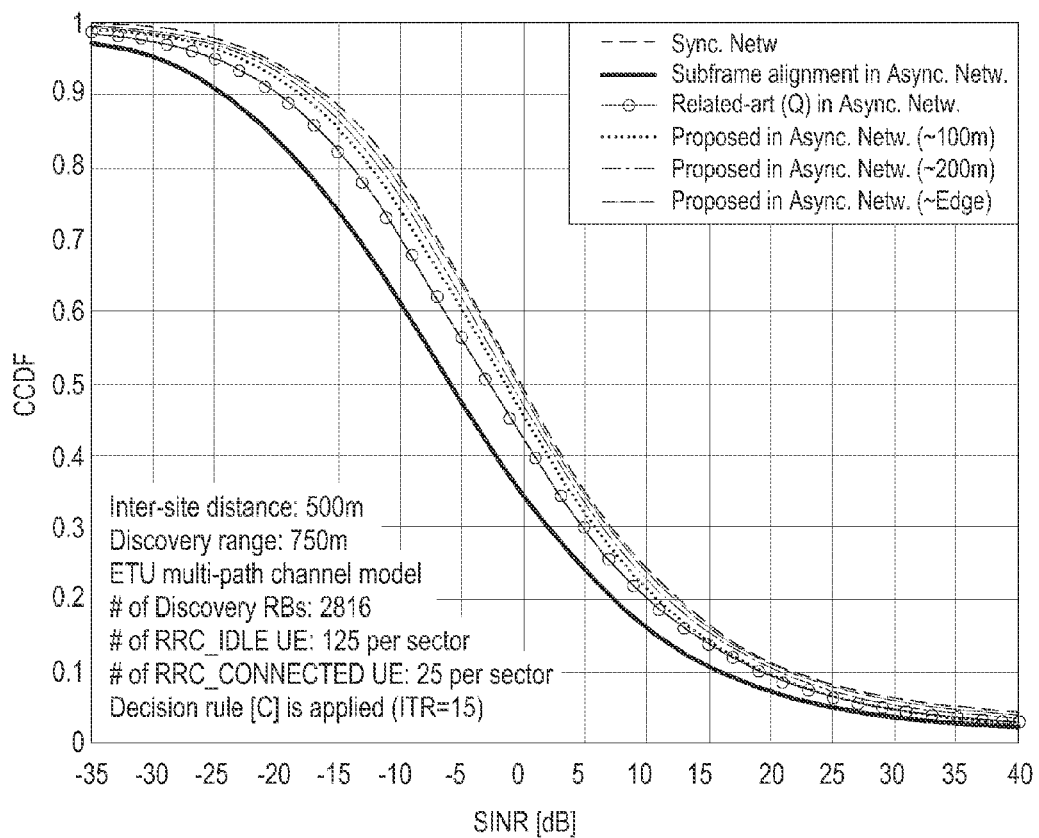
FIG. 20 is a graph illustrating a UE's SINR performance depending on estimation error e according to an embodiment of the present disclosure.

FIG. 20 is a graph illustrating a UE's SINR performance depending on estimation error e according to an embodiment of the present disclosure.

Referring to FIG. 20, the graph shows CCDF performance of discovery signal reception of a UE for each for the first method, the second method, and the third method according to an embodiment of the present disclosure.

Comparison was made between the methods depending on positions of the UE with the maximum RTT, and the performance of the inventive technique was analyzed for the environment where UEs are only present within a reference radius range, 100 m or 200 m, from the eNB relative to the case where no UE is present at the cell edge. As can be seen from a result of the performance analysis, the inventive technique does not experience a noticeable performance deterioration even under the environment where the UEs are located only within a reference radius of 100 m from the eNB. From this, it can be also verified that estimation error e depending on the position of the UE does not have a significant influence so long as the UE can detect the PSS of the neighbor cell.

Figure 21:
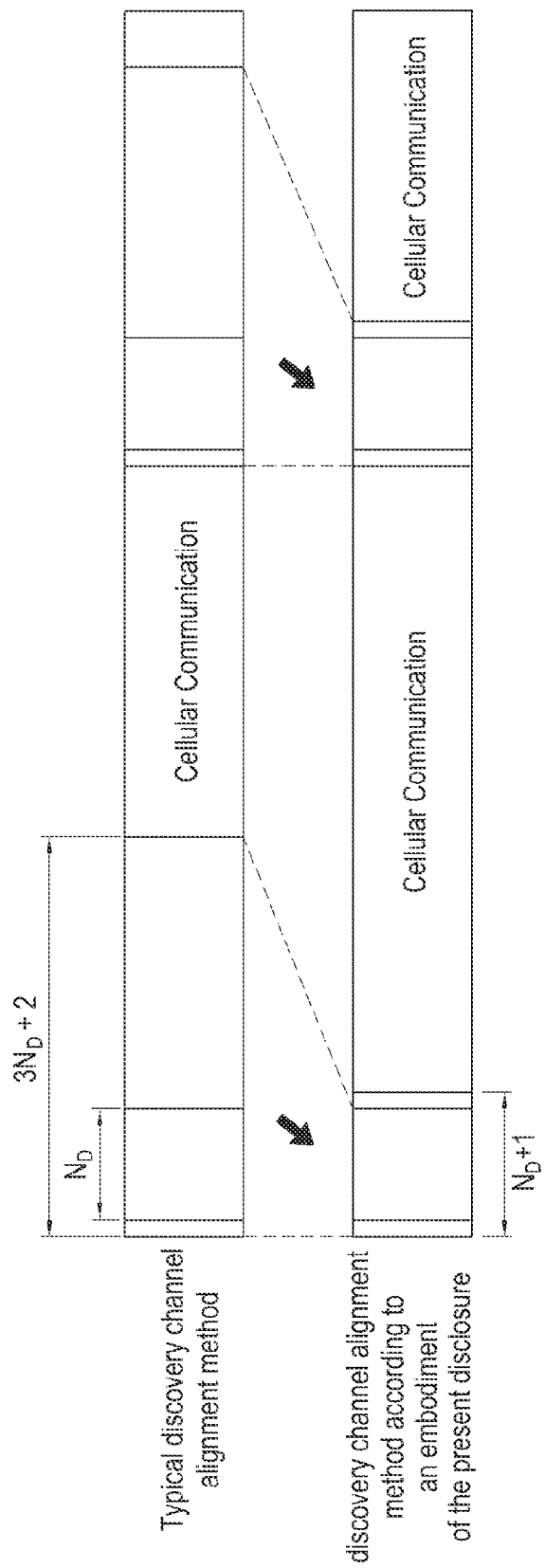
FIG. 21 is a view illustrating the respective in-frame cellular communication restriction intervals for a typical discovery channel aligning method and a discovery channel aligning method according to an embodiment of the present disclosure.

FIG. 21 is a view illustrating the respective in-frame cellular communication restriction intervals for a typical discovery channel aligning method and a discovery channel aligning method according to an embodiment of the present disclosure.

Referring to FIG. 21, the typical discovery channel interval aligning method is structured to receive discovery corresponding to $(2N_D+2)$ subframes in addition to $N_D$ subframes that is the length of the legacy discovery channel in order to receive discovery signals at the discovery channel position of two neighbor cells. In this case, during the subframe interval where the discovery signal is received, cellular communication using PRBs is restricted, and cellular communication of all the UEs located in each cell is repeatedly restricted by the discovery period.

On the contrary, in the discovery channel aligning method according to an embodiment of the present disclosure, a DTA, a discovery channel adjusted value, applies, so that, considering that scheduling is performed every 1 ms by the LTE system eNB, only cellular communication restriction intervals up to one subframe are repeatedly created before and after each discovery channel. This form can be said to significantly reduce the size of cellular communication restriction interval relative to $(2N_D+2)$ subframes repeatedly created in the typical discovery channel aligning method.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The apparatuses and methods for aligning inter-cell discovery channels, according to embodiments of the present disclosure, may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disk (CD), a digital video disk (DVD), a magnetic disk, or a magnetic tape, which allows for optical or magnetic recording while simultaneously read out by a machine (e.g., a computer). The methods for aligning inter-cell discovery channels according to an embodiment of the present disclosure may be implemented by a computer or portable terminal including a controller and a memory, and the memory may be an example of a non-transitory storage medium that may be read out by a machine appropriate to store a program or programs including instructions for realizing the embodiments of the present disclosure.

Accordingly, the present disclosure encompasses a program containing codes for implementing the device or method set forth in the claims of this disclosure and a non-transitory machine (e.g., computer)-readable storage medium storing the program. The program may be electronically transferred via any media such as communication signals transmitted through a wired or wireless connection and the present disclosure properly includes the equivalents thereof.

The apparatuses for aligning inter-cell discovery channels according to embodiments of the present disclosure may receive the program from a program providing device wiredly or wirelessly connected thereto and store the same. The program providing device may include a memory for storing a program including instructions to enable the inter-cell discovery channel aligning apparatus to perform a preset inter-cell discovery channel aligning method and information necessary for the inter-cell discovery channel aligning method, a communication unit for performing wired or wireless communication with the inter-cell discovery channel aligning apparatus, and a controller transmitting the program to the communication device automatically or at the request of the inter-cell discovery channel aligning apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for aligning discovery channel intervals of a serving cell and a neighbor cell, by a serving evolved node b (eNB) managing the serving cell, in a cellular communication system, the method comprising:
   selecting at least one user equipment (UE) being located in the serving cell and operates in a radio resource control (RRC) connected mode;
   transmitting, to the at least one UE, a request message requesting information related to a discovery channel of the neighbor cell;
   receiving, from the at least one UE, a temporally adjusted value obtained by shifting the discovery channel with respect to a frame reference time of the neighbor cell, or a network time difference (NTD) between the serving cell and the neighbor cell; and
   aligning a discovery channel interval of the serving cell to a discovery channel interval of the neighbor cell based on the at least one of the temporally adjusted value, or the NTD.

2. The method of claim 1, wherein the aligning of the discovery channel interval of the serving cell comprises:
   determining a representative NTD based on the NTD;
   estimating a start time of the discovery channel of the neighbor cell based on the representative NTD, the temporally adjusted value and a frame reference time of the serving cell; and
   determining the temporally adjusted value obtained by shifting the discovery channel of the neighbor cell with respect to the frame reference time of the serving cell based on the start time of the discovery channel of the neighbor cell and the frame reference time of the serving cell.

3. The method of claim 2, wherein in a case where the NTD is received from a plurality of UEs, the NTD received from a UE with a maximum round trip time (RTT) is determined as the representative NTD.

4. The method of claim 1, wherein the selecting of the at least one UE comprises:
   identifying maximum round trip times (RTTs) for UEs located in the serving cell and operating in the RRC connected mode; and
   selecting n UEs with a highest RTT value with respect to the UE with the maximum RTT.

5. The method of claim 1, further comprising:
   in a case where the ID of the neighbor cell, the temporally adjusted value, and the NTD are not received, bundling UEs located in the serving cell and operating in an RRC idle mode into a predetermined number of groups;
   selecting UEs included in a particular group among the predetermined number of groups;
   transmitting, to the selected UEs, a request message requesting information related to the discovery channel of the neighbor cell; and
   receiving, from UEs receiving the request message, the ID of the neighbor cell, the temporally adjusted value, and the NTD.

6. The method of claim 1, further comprising:
   in a case where an ID, a temporally adjusted value, and an NTD for each of a plurality of neighbor cells are received, identifying a start time of a discovery channel of each of the plurality of neighbor cells; and
   determining a temporally adjusted value obtained by shifting the discovery channel with respect to the frame reference time of the serving cell based on an earliest time among the identified start times.

7. The method of claim 1, further comprising:
   in a case where an ID, a temporally adjusted value, and an NTD for each of a plurality of neighbor cells are received, identifying a start time of a discovery channel of each of the plurality of neighbor cells; and
   determining a temporally adjusted value obtained by shifting the discovery channel with respect to the frame reference time of the serving cell based on an average value of the identified start times.

8. The method of claim 1, further comprising:
in a case where an ID, a temporally adjusted value, and an NTD for each of a plurality of neighbor cells are received, identifying a start time of a discovery channel of each of the plurality of neighbor cells;
determining a temporally adjusted value obtained by shifting the discovery channel with respect to the frame reference time of the serving cell based on a start time of a discovery channel of a group where the neighbor cell are aligned; and
in a case where there are two or more groups having a same number of neighbor cells aligned, determining a temporally adjusted value obtained by shifting the discovery channel with respect to the frame reference time of the serving cell based on a start time of a discovery channel with an earlier time.

9. A method for aligning discovery channel intervals of a serving cell and a neighbor cell, by a user equipment (UE), in a cellular communication system, the method comprising:
receiving, from a serving evolved node b (eNB) managing the serving cell, a request message requesting information related to a discovery channel of the neighbor cell;
detecting a downlink synchronization signal from the neighbor cell;
obtaining a reception time of the downlink synchronization signal of the neighbor cell;
detecting a downlink synchronization signal from the serving cell and obtaining a reception time of the downlink synchronization signal of the serving cell;
estimating a network time difference (NTD) between the serving cell and the neighbor cell based on the downlink synchronization signal reception time of the neighbor cell and the downlink synchronization signal reception time of the serving cell; and
transmitting the NTD to the serving eNB.

10. The method of claim 9, further comprising:
obtaining an identifier (ID) of the neighbor cell from the downlink synchronization signal detected from the neighbor cell;
detecting a master information block (MIB) and a system information block (SIB) and obtaining a temporally adjusted value obtained by shifting the discovery channel with respect to the frame reference time of the neighbor cell; and
transmitting the ID of the neighbor cell and the temporally adjusted value to the serving eNB.

11. An evolved node b (eNB) for aligning discovery channel intervals of a serving cell and a neighbor cell in a cellular communication system, the eNB comprising:
at least one processor configured to:
select at least one user equipment (UE) located in the serving cell managed by the eNB and operating in a radio resource control (RRC) connected mode, and
align a discovery channel interval of the serving cell to a discovery channel interval of the neighbor cell based on at least one of a temporally adjusted value obtained by shifting a discovery channel with respect to a frame reference time of the neighbor cell, or a network time difference (NTD) between the serving cell and the neighbor cell;
a transmitter configured to transmit, to the at least one UE, a request message requesting information related to the discovery channel of the neighbor cell; and
a receiver configured to receive, from the at least one UE, the at least one of the temporally adjusted value, or the NTD.

12. The eNB of claim 11, wherein the at least one processor is further configured to:
determine a representative NTD based on the NTD, to estimate a start time of the discovery channel of the neighbor cell based on the representative NTD, the temporally adjusted value and the frame reference time of the serving cell, and
determine the temporally adjusted value obtained by shifting the discovery channel of the neighbor cell with respect to the frame reference time of the serving cell based on the start time of the discovery channel of the neighbor cell and the frame reference time of the serving cell.

13. The eNB of claim 12, wherein in a case where the NTD is received from a plurality of UEs, the NTD received from a UE with a maximum round trip time (RTT) is determined as the representative NTD.

14. The eNB of claim 11, wherein the at least one processor is further configured to:
identify maximum RTTs for UEs located in the serving cell and operating in the RRC connected mode, and
select n UEs with a highest RTT value with respect to the UE with the maximum RTT.

15. The eNB of claim 11, wherein in a case where the ID of the neighbor cell, the temporally adjusted value, and the NTD are not received:
the at least one processor is further configured to:
bundle UEs located in the serving cell and operating in an RRC idle mode into a predetermined number of groups, and
select UEs included in a particular group among the predetermined number of groups,
the transmitter is configured to transmit, to the selected UEs, a request message requesting information related to the discovery channel of the neighbor cell, and
the receiver is further configured to receive from the UEs the request message, the ID of the neighbor cell, the temporally adjusted value, and the NTD.

16. The eNB of claim 11, wherein in a case where an ID, a temporally adjusted value, and an NTD for each of a plurality of neighbor cells are received, the at least one processor is configured to:
identify a start time of a discovery channel of each of the plurality of neighbor cells, and
determine a temporally adjusted value obtained by shifting the discovery channel with respect to the frame reference time of the serving cell based on an earliest time among the identified start times.

17. The eNB of claim 11, wherein in a case where an ID, a temporally adjusted value, and an NTD for each of a plurality of neighbor cells are received, the at least one processor is further configured to:
identify a start time of a discovery channel of each of the plurality of neighbor cells, and
determine a temporally adjusted value obtained by shifting the discovery channel with respect to the frame reference time of the serving cell based on an average value of the identified start times.

18. The eNB of claim 11,
wherein in a case where an ID, a temporally adjusted value, and an NTD for each of a plurality of neighbor cells are received, the at least one processor is further configured to:
identify a start time of a discovery channel of each of the plurality of neighbor cells, and
determine a temporally adjusted value obtained by shifting the discovery channel with respect to the frame reference time of the serving cell based on a start time of a discovery channel of a group where the neighbor cell are aligned, and wherein, in a case where there are two or more groups having a same number of neighbor cells aligned, the at least one processor is further configured to determine a temporally adjusted value obtained by shifting the discovery channel with respect to the frame reference time of the serving cell based on a start time of a discovery channel with an earlier time.

19. A user equipment (UE) for aligning discovery channel intervals of a serving cell and a neighbor cell in a cellular communication system, the UE comprising:

a receiver configured to:
- receive, from a serving evolved node b (eNB) managing the serving cell, a request message requesting information related to a discovery channel of the neighbor cell,
- detect a downlink synchronization signal from the neighbor cell and obtain a reception time of the downlink synchronization signal of the neighbor cell, and
- detect a downlink synchronization signal from the serving cell and obtain a reception time of the downlink synchronization signal of the serving cell;

at least one processor configured to estimate a network time difference (NTD) between the serving cell and the neighbor cell based on the downlink synchronization signal reception time of the neighbor cell and the downlink synchronization signal reception time of the serving cell; and a transmitter configured to transmit the NTD to the serving eNB.

20. The UE of claim 19, wherein the receiver is further configured to:
- obtain an identifier (ID) of the neighbor cell from the downlink synchronization signal detected from the neighbor cell,
- detect a master information block (MIB) and a system information block (SIB), and
- obtain a temporally adjusted value obtained by shifting the discovery channel with respect to the frame reference time of the neighbor cell, and wherein the transmitter is further configured to transmit the ID of the neighbor cell and the temporally adjusted value to the serving eNB.

* * * * *